US011746888B2

(12) United States Patent
Mayville et al.

(10) Patent No.: US 11,746,888 B2
(45) Date of Patent: *Sep. 5, 2023

(54) VEHICLE SHIFTER WITH SCROLL COMPONENT

(71) Applicant: Kuster North America, Inc., Troy, MI (US)

(72) Inventors: Brian Andrew Mayville, Northville, MI (US); Calogero Alu, Shelby Charter Township, MI (US); Thorsten Dirk Connemann, Ehringshausen (DE)

(73) Assignee: Kuster North America, Inc., Troy, MI (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/178,881

(22) Filed: Feb. 18, 2021

(65) Prior Publication Data
US 2021/0254708 A1    Aug. 19, 2021

Related U.S. Application Data

(60) Provisional application No. 62/978,400, filed on Feb. 19, 2020.

(51) Int. Cl.
*F16H 59/08* (2006.01)
*F16H 59/02* (2006.01)
(Continued)

(52) U.S. Cl.
CPC ............. *F16H 59/08* (2013.01); *B60K 35/00* (2013.01); *B60Q 3/10* (2017.02); *F16H 59/0278* (2013.01);
(Continued)

(58) Field of Classification Search
CPC ....... F16H 2059/0243; F16H 2059/081; F16H 2059/026; B62D 1/046; B60K 35/00; B60K 2370/782
(Continued)

(56) References Cited

U.S. PATENT DOCUMENTS 9,552,148 B2    1/2017  Kim et al.
10,352,440 B2   7/2019  Fribus et al.
(Continued)

FOREIGN PATENT DOCUMENTS

CN        110094494 A       8/2019
DE    102018009557 A1  *  6/2020
(Continued)

OTHER PUBLICATIONS

International Search Report and Written Opinion issued by the Korean Intellectual Property Office acting as International Searching Authority for International Patent Application No. PCT/US2021/018546 dated Jun. 25, 2021 (11 pages in total).

*Primary Examiner* — T. Scott Fix
(74) *Attorney, Agent, or Firm* — Dinsmore & Shohl LLP

(57) ABSTRACT

A scrolling shifter assembly having a housing rotatably supporting a scrolling wheel having a knurled exterior edge accessible to a vehicle operator, the scrolling wheel also including an annular side detent profile. A magnet is positioned in proximity to a sensor mounted to a printed circuit board (PCBA) within the housing and displaces relative to the sensor in response to rotation of the scrolling wheel. A display component is mounted in proximity to the PCBA. At least one haptic biasing component including any of spring
(Continued)

loaded pawl or wave spring is supported within the housing and biases against the detent profile such that, and upon the operator actuating the scrolling wheel, the pawl is caused to displace relative to the profile in order to incrementally rotate the wheel, the magnet rotating relative to the PCBA sensor to cause an associated processor to electronically instruct a shift change to an engine control unit.

26 Claims, 21 Drawing Sheets

(51) Int. Cl.
*B60Q 3/10* (2017.01)
*G05G 1/08* (2006.01)
*H01H 19/00* (2006.01)
*H01H 19/04* (2006.01)
*H01H 19/14* (2006.01)
*H01H 19/20* (2006.01)
*B60K 35/00* (2006.01)

(52) U.S. Cl.
CPC .............. *G05G 1/08* (2013.01); *H01H 19/001* (2013.01); *H01H 19/04* (2013.01); *H01H 19/14* (2013.01); *H01H 19/20* (2013.01); *B60K 2370/126* (2019.05); *B60K 2370/774* (2019.05); *B60K 2370/782* (2019.05); *F16H 2059/026* (2013.01); *F16H 2059/0282* (2013.01); *F16H 2059/0295* (2013.01)

(58) Field of Classification Search
USPC .......................................................... 74/552
See application file for complete search history.

(56) References Cited

U.S. PATENT DOCUMENTS

| 10,436,309 | B2 | 10/2019 | Lumetta |  |
|---|---|---|---|---|
| 10,780,909 | B2 | 9/2020 | Aerts et al. |  |
| 2010/0200375 | A1* | 8/2010 | Han | B62D 1/046 200/61.54 |
| 2012/0096979 | A1 | 4/2012 | Trujillo Linke |  |
| 2014/0062891 | A1* | 3/2014 | Powell | B60K 37/06 345/173 |
| 2016/0017983 | A1 | 1/2016 | Levesque et al. |  |
| 2016/0245396 | A1 | 8/2016 | Behounek et al. |  |
| 2016/0245402 | A1 | 8/2016 | Fribus et al. |  |
| 2018/0259063 | A1 | 9/2018 | Wang et al. |  |
| 2018/0320780 | A1* | 11/2018 | Heo | F16H 59/02 |
| 2019/0032772 | A1* | 1/2019 | Kim | F16H 59/08 |
| 2019/0383386 | A1 | 12/2019 | Harris et al. |  |
| 2020/0039558 | A1 | 2/2020 | Aerts et al. |  |

FOREIGN PATENT DOCUMENTS

| DE | 102019006754 A1 * | 4/2021 | |
|---|---|---|---|
| JP | 5394282 B2 * | 1/2014 | ............ B60K 37/06 |
| JP | 6130261 A * | 5/2017 | |
| KR | 10-2015-0134881 A | 12/2015 | |

* cited by examiner

FIG. 1

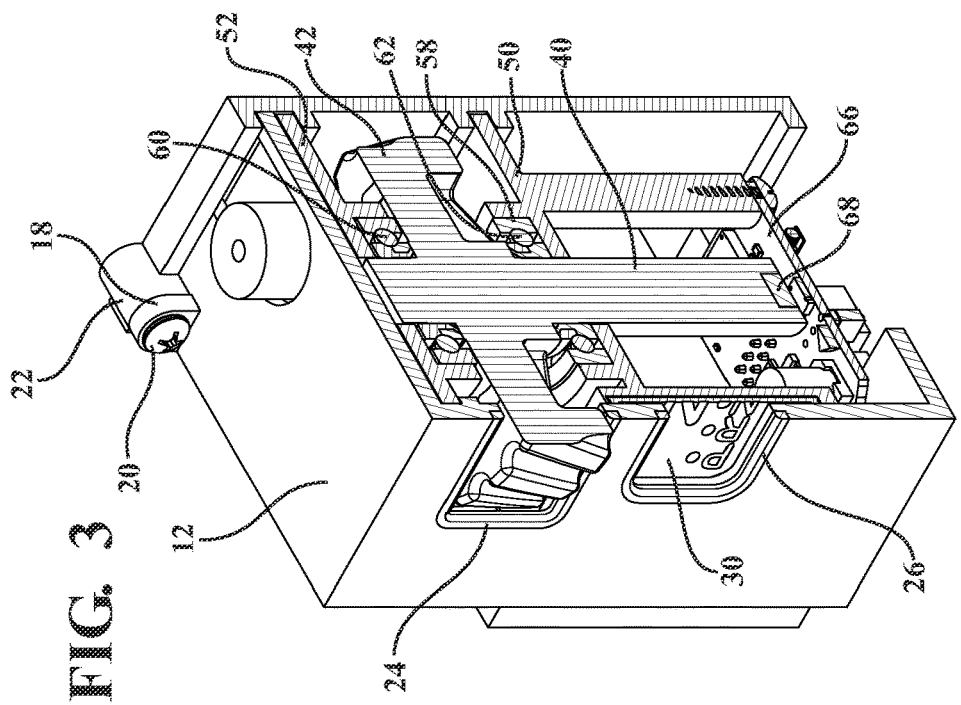
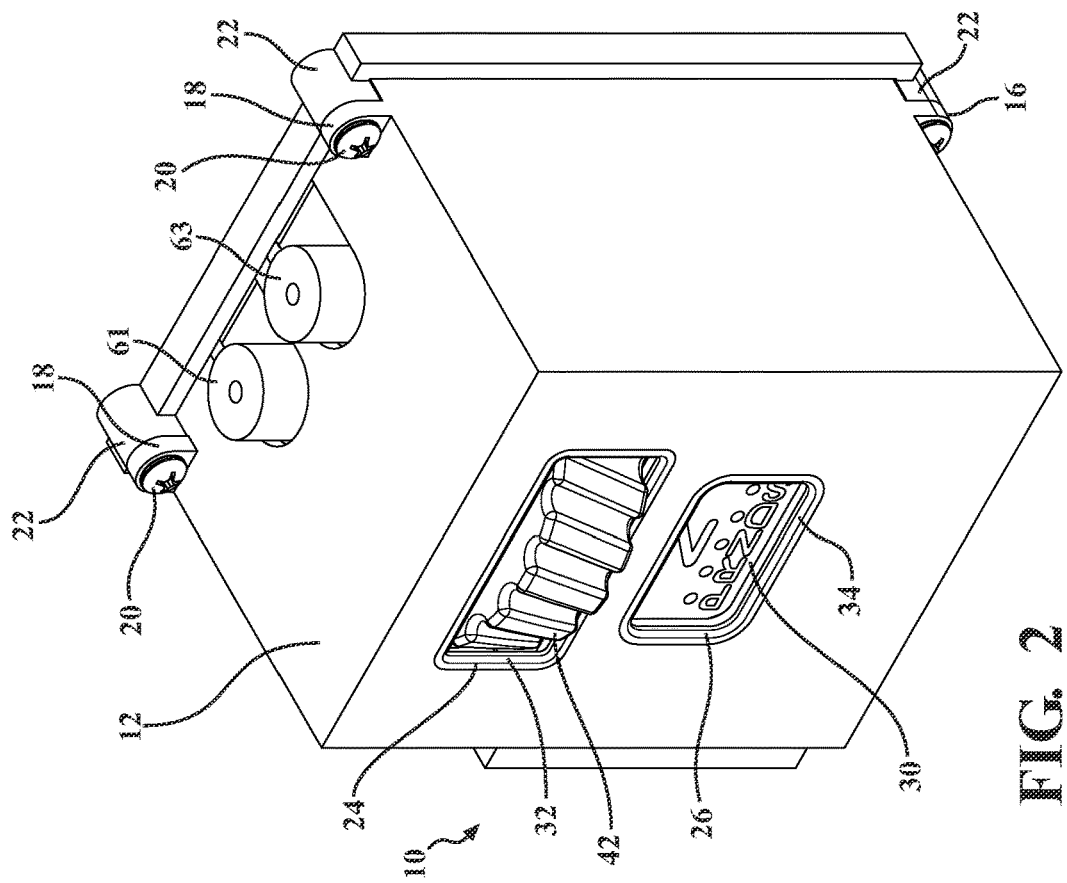

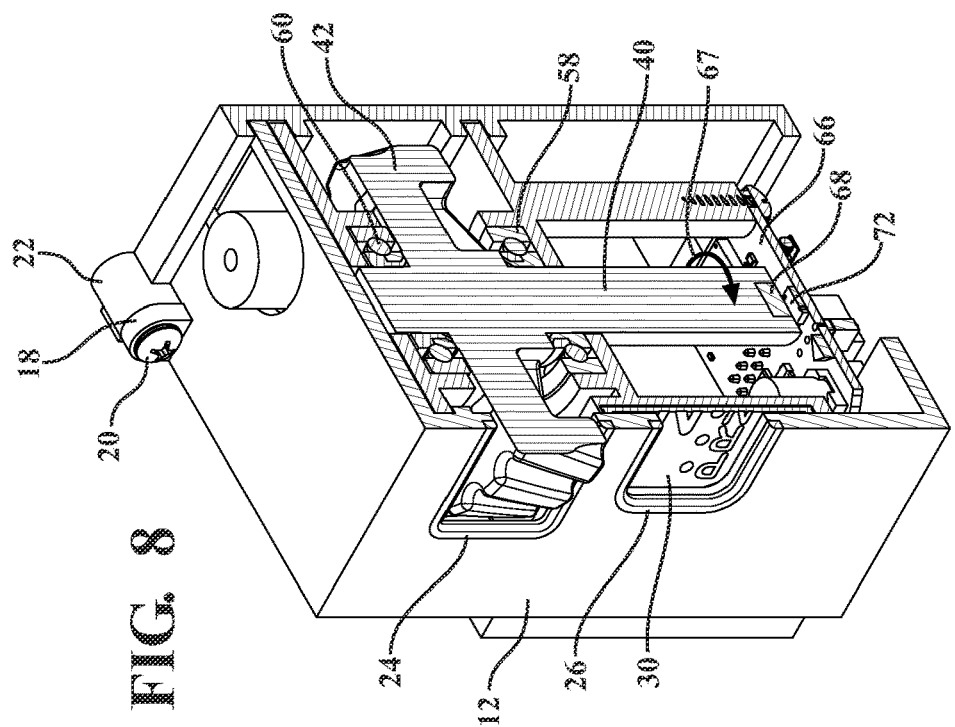
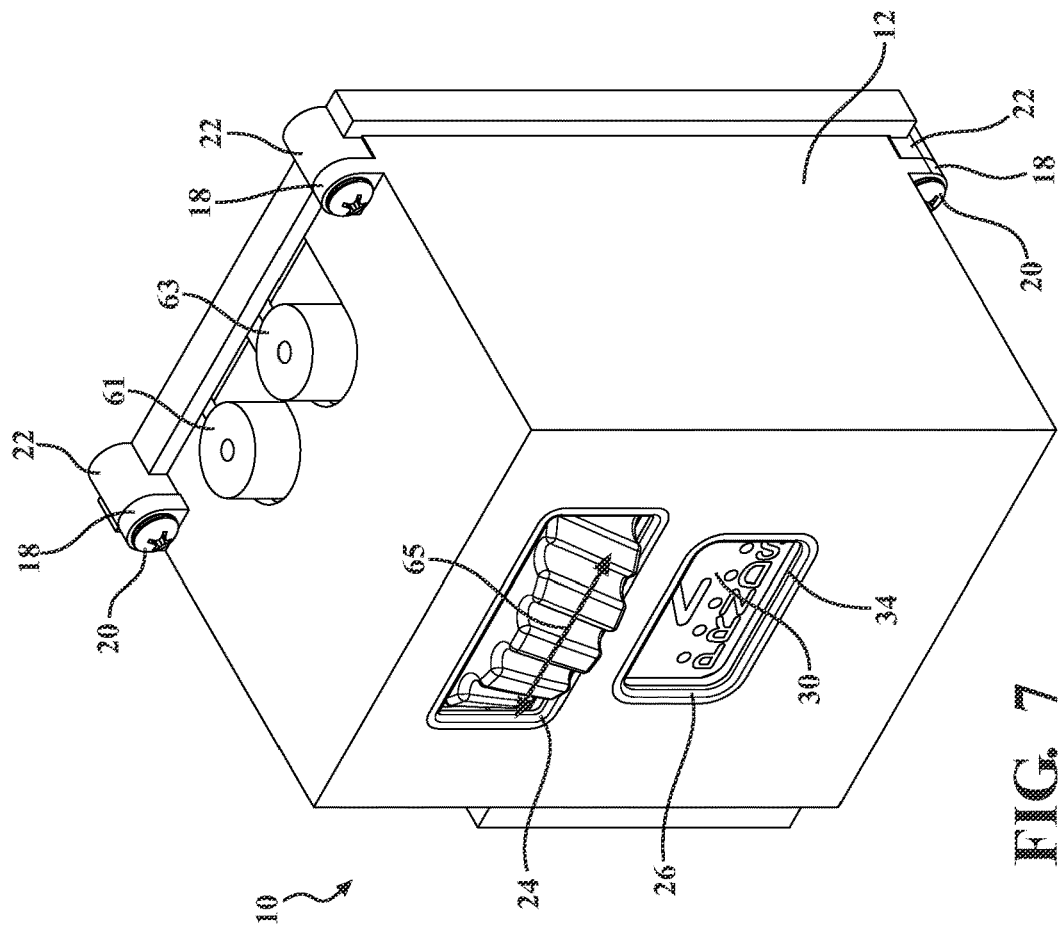

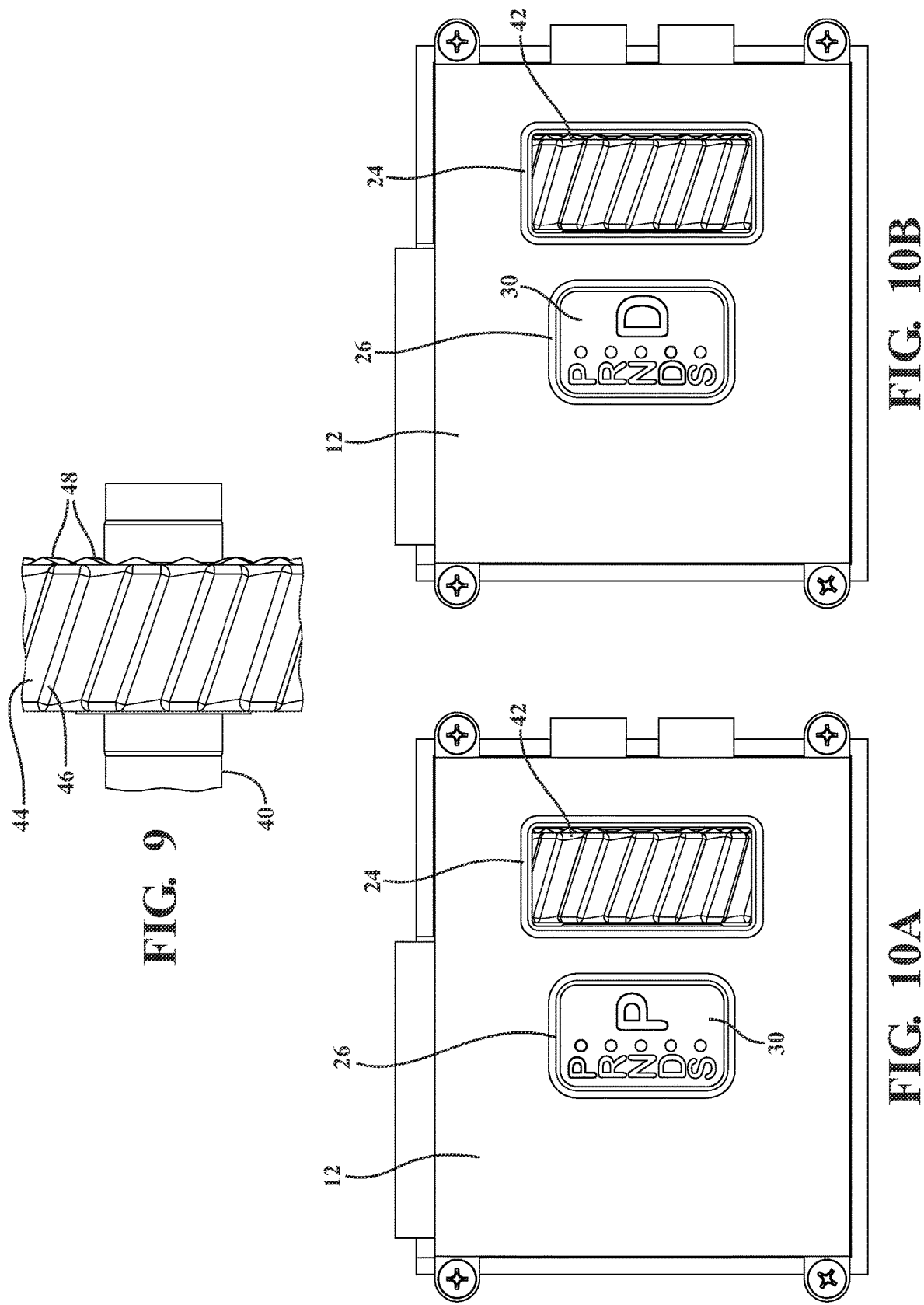

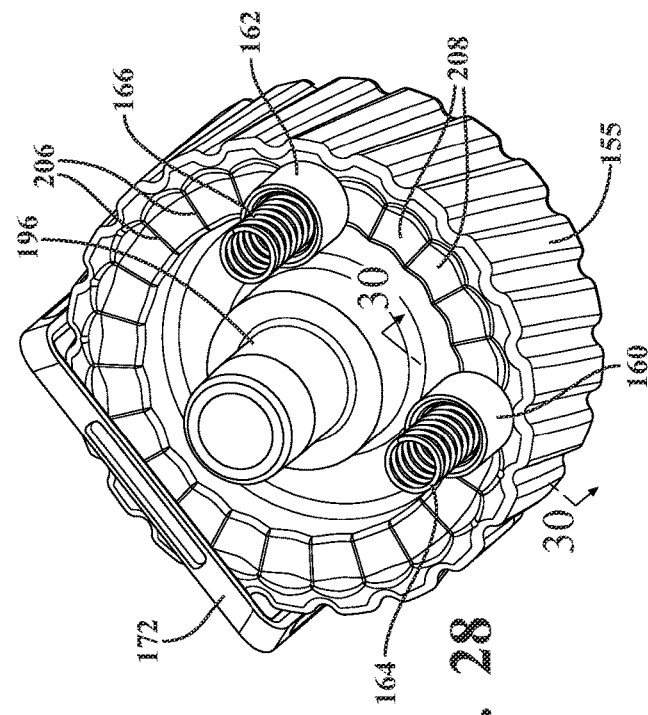
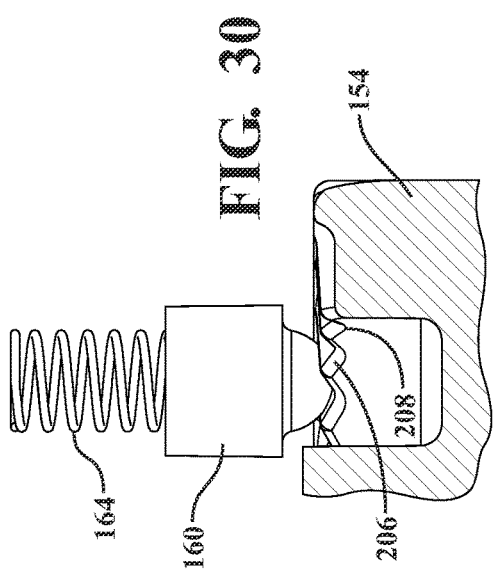
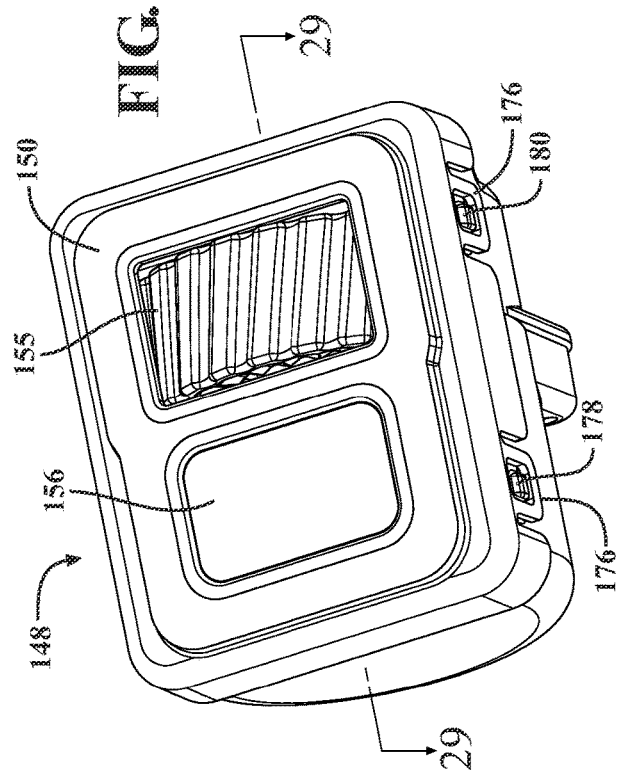
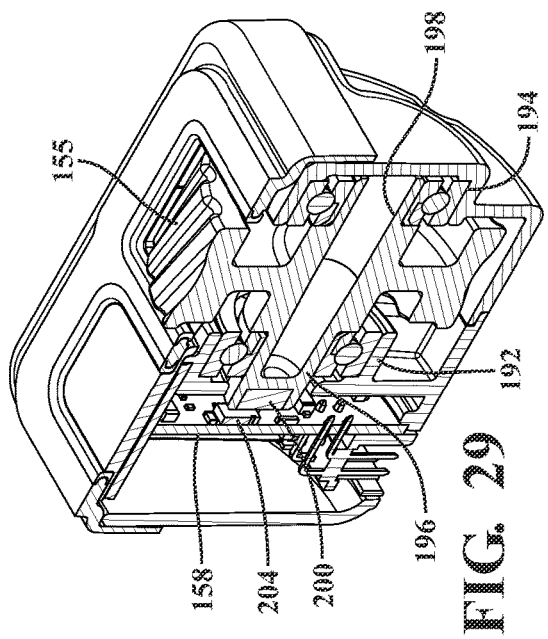

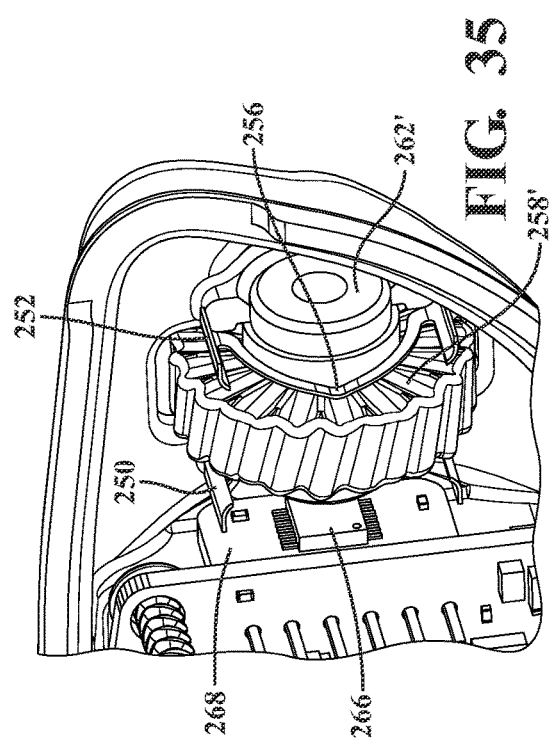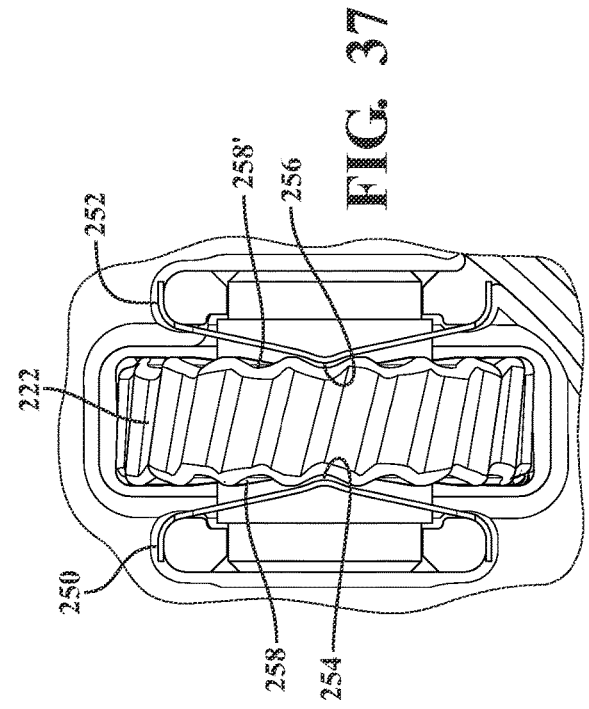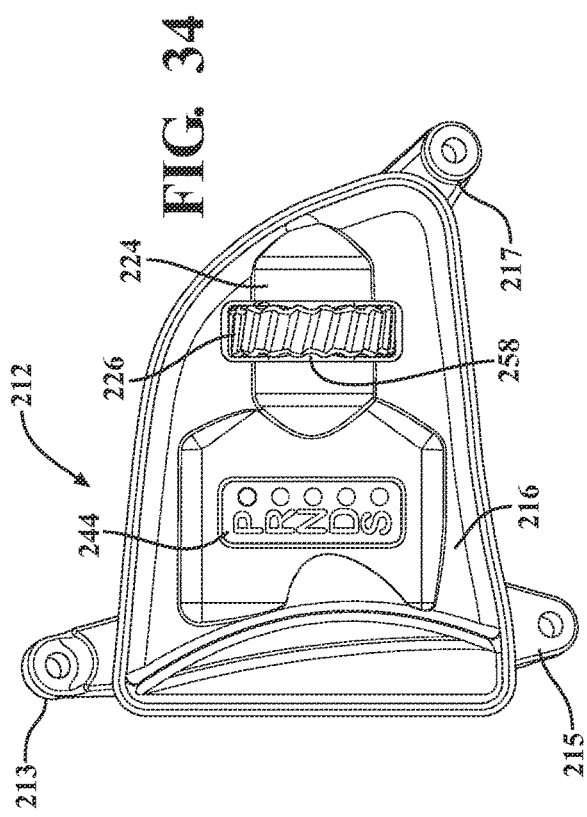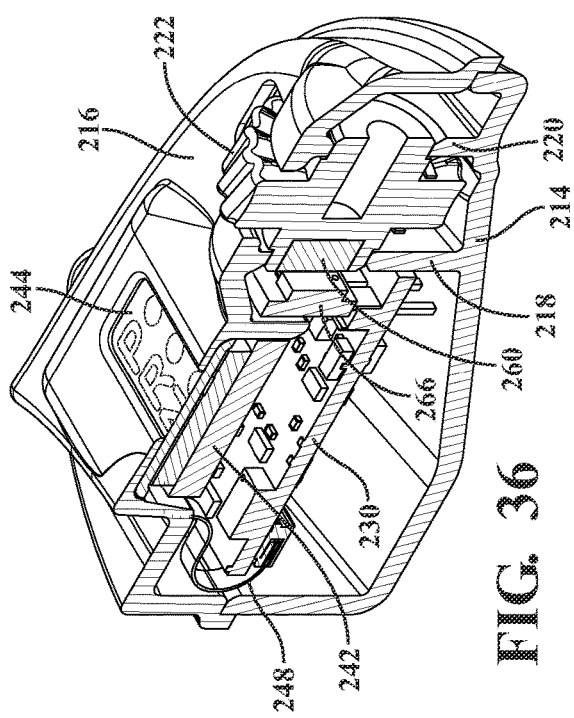

VEHICLE SHIFTER WITH SCROLL COMPONENT

CROSS REFERENCE TO RELATED APPLICATIONS

The present application claims the priority of U.S. Ser. No. 62/978,400 filed Feb. 19, 2020.

FIELD OF THE INVENTION

The present invention relates generally to shifter assemblies. More specifically, the present invention discloses a scrolling shifter adapted to being mounted at varied locations within a vehicle interior according to any desired orientation (steering wheel, stalk, dashboard, IP, etc.) and providing 360 degree rotational functionality, via a scroll wheel or knob component having a knurled annular edge for engagement by the operator in combination with a separate end face detent profile, this further defining alternating peaks and valleys which interfaces with plural biased pawls supported within the shifter housing in order to allow the operator to scroll through the various gear positions. The assembly further provides both of return to park on command from any gear as well as park and neutral lock functionality.

BACKGROUND OF THE INVENTION

A first example of a known shifter assembly according to the prior art is disclosed in Fribus U.S. Pat. No. 10,352,440 (ZF Friedrichshafen) discloses a shift by wire actuator with a scrolling component for selecting a gear position, in combination with a release button coupled via a locking and releasing mechanism. In this fashion, the scrolling knob selects a shifter position following a release signal issued by the locking and release mechanism.

Lumetta U.S. Pat. No. 10,436,309 (FCA Italy) teaches an electronic control system for an auto transmission which can include vehicle shifter position scroll elements mounted to such as a steering column switch (FIG. 4) or a knob configuration (FIG. 5).

Trujillo Linke US 2012/0096979 teaches a vehicle steering device including (with reference to FIGS. 4A-4E) a thumb operable and scroll functional element 49 located on the left inner edge of the console 9 proximate the driver s left hand. In this instance, the scroll element operates from a menu display for selecting internet related features.

Other known references include the rotary gear shifter of Levesque 2016/0017983 (Dura) and the rotary shifter of Harris 2019/0383386 (GHSP).

Additional references include U.S. Pat. No. 10,780,909 which teaches an interactive user interface for a steering wheel. A user interface is provided on one or more portions of the steering wheel which recognizes gesture movements made by a user thereon. The user interface allows navigation of a set of controls associated with a menu provided through the user interface based on the recognized gesture movements.

SUMMARY OF THE PRESENT INVENTION

The present invention discloses a scrolling shifter assembly, such without limitation including application to any of a gear shifter, windshield wiper control, or volume or dimmer control. The scrolling shifter can be located at any vehicle interior location not limited to a steering wheel, stalk, dashboard, windshield wiper control, volume or dimmer control or other location within a vehicle instrument panel.

In any embodiment, the assembly includes a housing rotatably supporting a scrolling wheel having a knurled exterior edge accessible to a vehicle operator, the scrolling wheel in turn including an annular detent profile defined on either or both of opposite disposed end faces of the scrolling wheel, the detent profiles each exhibiting alternating peaks and trenches. A magnet is incorporated into a rotatable shaft supported end face of the scrolling wheel so that it is positioned in proximity to a sensor mounted to a printed circuit board assembly (PCBA) within the housing. Rotation of the scroll wheel displaces the magnet relative to the sensor in order for the PCBA to instruct any of gear shift or (in an alternate application) other change of position/condition.

A display component is mounted in proximity to the PCBA and can include any of a thin film transistor (TFT), organic light emitting diode (OLED) or segmented display. In a first embodiment, at least one pawl is supported within the housing and is spring loaded to bias against each of the annular detent profiles such that, and upon the operator actuating the scrolling wheel, the pawl is caused to displace relative to the profile in order to incrementally rotate the wheel, the magnet rotating relative to the PCBA sensor to electronically instruct a shift change by a processor associated with the PCBA. Other variants substitute the spring loaded pawls in favor of wave springs having rounded profiles for biasing against the alternating detent peaks and trenches in order to provide the desired haptic/tactile effect between successive gears or positions.

The housing further includes a variety of shaped housings for incorporating into the desired vehicle location with an attachable bottom cover. Any arrangement of plates or bushings can be provided for rotatably supporting the scrolling wheel and biasing pawls or wave springs within the housing. Other features include a pair of windows defined in an upper face of the main housing for seating each of the scrolling wheel and the display component.

A return to park function provides for the PCBA resetting the shifter to the Park position in response to a determined external input. Each of a Park Lock and Neutral Lock function is provided for preventing rotation of the scrolling wheel from effectuating a gear change, and unless the PCBA determines the existence of a necessary condition for providing electronic shifting.

In additional variants, the scrolling shifter assembly can be incorporated into the steering wheel, and such that rotation of the wheel is complemented by concurrent rotation of the assembly in a manner which maintains upright orientation relative to the operator for ease of access. The assembly can be interconnected mechanically to a central gear or support of the steering wheel in either of a gear train or pulley system.

In a third electrically driven option, a sensor arrangement is employed for converting rotation of the steering wheel into corresponding rotation of the rotary switching element. In a further non-limiting option an electronic adjusting sensor system is provided, such including a steering wheel angle sensor, for continuously reorienting the scroll assembly to an upright position. Other variants include substituting the mechanical or electrical options for physically reorienting the combined display and scrolling shifter, and in favor of reorienting a combination display portion of the scroll shifter assembly, in such instance including any type of capacitive or other touch screen display positioned upon the steering wheel.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an exploded view of a scrolling shifter assembly according to a non-limited embodiment of the present invention and illustrating the combination of housing, scrolling wheel, right and left support plates, detent pawls and supporting compression springs, PCBA and TFT/OLED/Segmented display;

FIG. 2 is an assembled perspective of the scrolling shifter assembly of FIG. 1;

FIG. 3 is a cutaway of FIG. 2 and depicting the scrolling wheel, support bearings and mounting plate components in combination with the outer housing and display components;

FIG. 7 is a substantial repeat of the illustration of FIG. 2 and FIG. 8 likewise being a substantial repeat of the illustration of FIG. 3 and better depicting the features of the scrolling wheel end supported magnet which, upon rotation in proximity to a PCBA mounted sensor, signals the associated processor to a gear shift condition;

FIG. 9 further depicts a non-limiting exterior annular pattern associated with the scrolling wheel;

FIGS. 10A and 10B illustrate a pair of views of an electronic return to park condition in which the shifter provides for returning to park from any gear upon command by the processor;

FIG. 27 is a perspective assembled view of the scrolling shifter assembly of FIG. 26;

FIG. 28 is a subset perspective of the scroll wheel with spring loaded detent pawls and knob bezel;

FIG. 29 is a cutaway view taken along line 29-29 of FIG. 27 and showing the interior assembled configuration of the scrolling shifter assembly with the scroll knob over-molded onto a shaft end supported magnet positioned in relation to the PCBA mounted sensor;

FIG. 30 is an enlarged partial perspective taken about area 30 of FIG. 28 and showing the haptic feedback interface established between the spring loaded pawls against an annular and undulating opposing side detent profile of the scroll knob which is generally perpendicular to its exterior knurled profile;

FIG. 34 is a front plan assembled view of the shifter assembly of FIG. 33;

FIG. 35 is an enlarged and partial cutaway perspective depicting the scrolling wheel mounted within the shifter housing of FIGS. 33-34 and illustrating the side supporting wave springs substituting for the detent spring loaded pawls of previous embodiments, for providing the haptic interface with the annular detent profiles arranged on opposite sides of the wheel;

FIG. 36 is a cross sectional cutaway of the shifter assembly of FIG. 34 and generally showing the interior assembled configuration of the shifter assembly with the scroll knob overmolded onto a shaft end supported magnet positioned in relation to the PCBA mounted sensor;

FIG. 37 is a subset perspective of the scroll wheel with opposite supported wave springs for assisting in providing the haptic interface during rotation of the wheel;

DETAILED DESCRIPTION OF THE PREFERRED EMBODIMENTS

Figure 4:
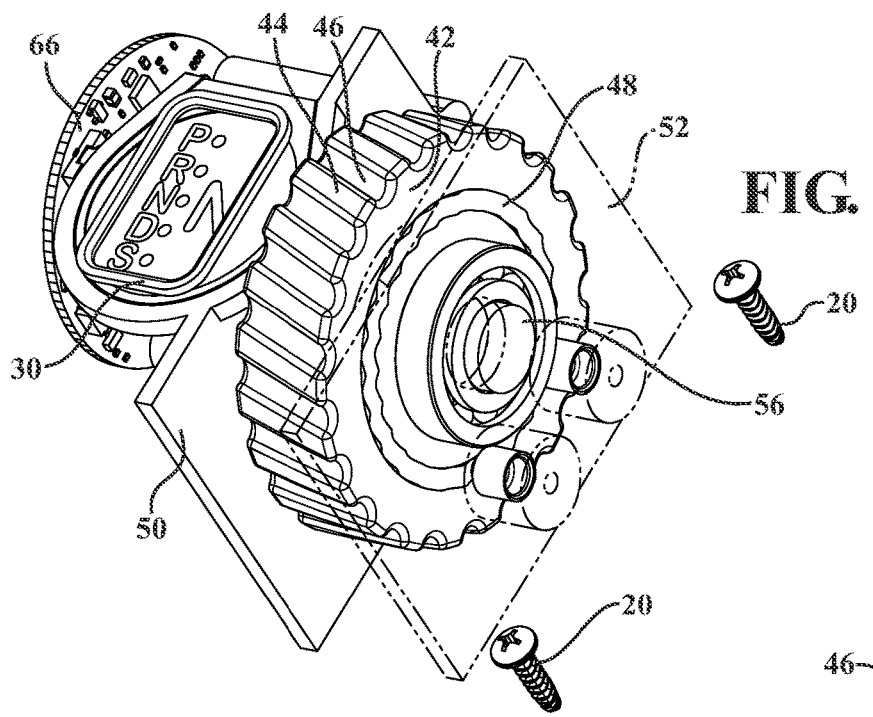
FIG. 4 is a perspective of the inner components of the scrolling shifter with the housing removed for clarify of illustration.

With reference to the attached drawings, the present invention discloses a number of variants of a scrolling vehicle shifter assembly, as shown in each of FIGS. 2, 27, 34 and 41, and which are amenable for configuring at different locations of a vehicle interior including again any of a console, dashboard, steering wheel or steering wheel stalk. As previously described, the scrolling shifter is adapted to being mounted within a vehicle interior according to any desired orientation and provides the operator with 360 degree functionality for scroll through the various gear positions. The assembly further provides both of return to park on command from any gear as well as park and neutral lock functionality.

As will be further described in each of the succeeding embodiments, the scrolling shifter assembly provides a number of functions including each of providing operator interface for transmission gear selection, operator haptic feedback while shifting through gear positions, as well as providing the operator with polystable positions (fixed positions for each gear position). Other features include the operator having access to the surface of the scrolling wheel while advancing through the gear positions. Other functions include each of return to park functionality on command and from any gear position, electronic park or neutral lock functions, and enhanced display options with gear position indication. Additional functionality includes the ability to orient the assembly for up/down or left/right scrolling for gear selection, as well as design flexibility for reduction in size for incorporation into varying locations including steering wheel, steering wheel stalk and any other instrument panel or dashboard location.

Figure 1:
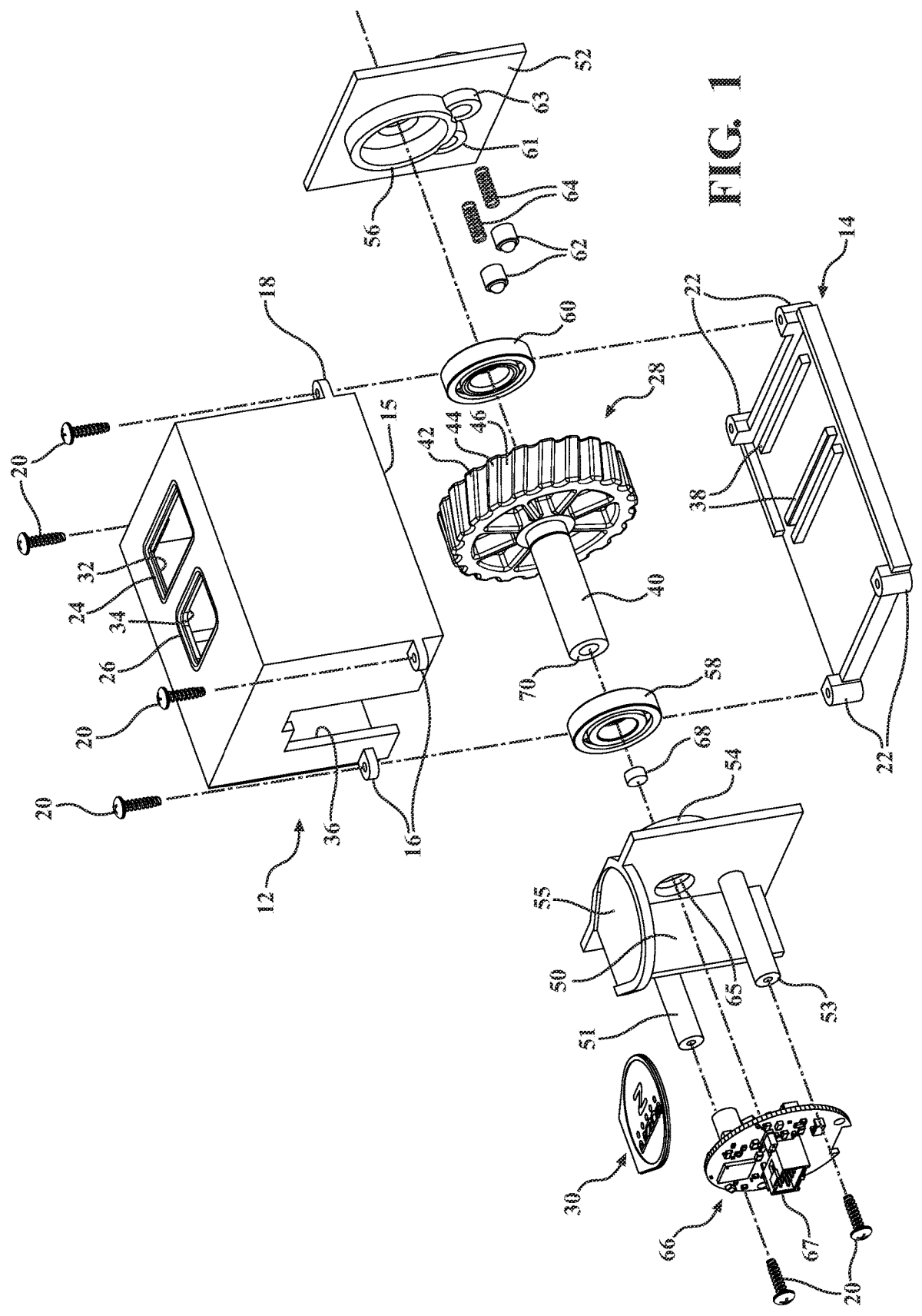

With reference initially to FIG. 1, an exploded view is shown of the scrolling shifter assembly according to a non-limited embodiment, and which is generally represented by designation of the assembly at 10 in the perspective of FIG. 2. A main housing 12 is provided which can be constructed of any suitable material not limited to a finished metal and/or a rigid plastic composite. The housing 12 as shown exhibits a three dimensional rectangular interior, this as depicted in the alternate embodiments include being reconfigured with any other package space defining interior for supporting the various components of the scroll knob assembly.

A bottom cover is shown at 14 and is secured to an open bottom rim 15 of the main housing 12 via pairs of mating screw receiving portions, these depicted by pairs of ears 16/18 which extend from lower corners of the housing 14 and which align with pairs of collars 20/22 arranged at edge or corner locations of the bottom cover 14. Screws 20 are provided for securing the housing 12 and bottom cover 14 together.

A pair of window shaped apertures, such as rectangular shaped, are configured within a top face of the main housing 12 and are shown by interconnecting rim edges 24 and 26. The window apertures respectively revealing each of the knurled outer annular rim of a scrolling wheel generally shown at 28 and a display component 30, this as will be further described including any PCBA connected TFT/OLED or segmented display. The window apertures can include individual bezel displays shown at 32 and 34 seated over the rim defining edges 24 and 26 configured within the housing body 12. The main housing 12 also includes a notched side location 36 and through which exterior wire or cable connectors (such as can be associated with the return to park functionality) can extend to the interior located PCBA (described below at 66). Other features include elongated locating embossments 38 positioned upon the interior of the bottom cover 14, and which provide location and holding support to the plates 50 and 52 as further described below.

Figure 5:
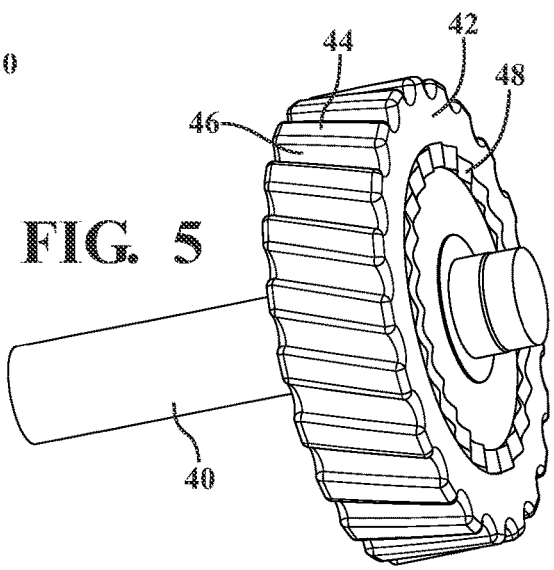
FIG. 5 is an enlarged perspective of the scrolling wheel and depicting a non-limiting representation of an outer annular knurled pattern for engagement by a user s thumb or fingers in combination with the upper end face arrayed detent profile.

The scrolling wheel 28 includes each of an extending shaft 40 and an annular disk projection 42 corresponding to a wheel shape, the disk projection further exhibiting a knurled pattern with alternating peaks 44 and valleys 46 (see in FIG. 5) arranged about its outer facing annular circumference. The scrolling wheel further includes a separate detent pattern 48 (see in FIGS. 5 and 10 which is configured upon an upper annular and side extending surface of the disk projection 42). As best shown in FIG. 5, the detent pattern 48 includes alternating peaks and valleys which, when contacted by the spring biased pawls 62, provides the desired haptic/tactile effect during rotation of the scrolling wheel 42.

The pair of first (or left) 50 and second (or right) 52 interior support plates are mounted within the interior of the main housing 12 and which include opposing annular recess defining collars (see at 54 and 56 for plates 50/52 respectively) for rotatably seating opposite ends of the scrolling wheel shaft 40. The left support plate 50 can include an upper seating location 55 for supporting the disk or saucer shaped display component 30, and so that it is aligned with the corresponding window defining bezel 34. A pair of collar shaped ball bearing components, at 58 and 60, are positioned at supporting locations of the shaft on opposite ends of the scrolling wheel 28 and relative to the plates 54/56 to permit the scrolling wheel 28 to be rotated about the shaft 40. Additional fastener screws 20 are also depicted in FIG. 1 and which secure the PCBA 66 to rearward projecting support locations 51 and 53 of the left inner support plate 50.

A pair of pawl elements 62 and corresponding detent (or compression) springs 64 are supported at additional seating locations, at 61 and 63, of the right plate 52 in a manner to bias the pawl elements against the peaks and valleys (or trench) of the detent profile 48 in order to provide a tactile interface with the operator. A PCBA (printed circuit board assembly) 66 component is provided which is mounted to the left plate 50. A receiving connector 67 is configured on a rear surface of the PCBA 66 for engagement by a separate vehicle connector (not shown).

The shaft 40 of the scrolling wheel inserts through an aperture 65 in the left plate 50 in such a fashion that an end supported magnet 68 (which can be mounted or in-molded into the extending shaft end location 70), and is adapted to rotate along with the shaft in proximity to a sensor 72 (see in FIG. 8) located upon a surface of the PCBA 66, the sensor in turn connected to a microprocessor component of the PCBA to electronically instruct a change in gear positioning. In an alternate variant, the magnet 68 can be relocated from the scrolling wheel to another location within the assembly and can be actuated by either of a gear train and/or pulley system interconnecting the scrolling wheel with the displacement (rotation) of the magnet.

FIG. 2 is an assembled perspective of the scrolling shifter assembly of FIG. 1 and depicting an exposed portion of the annular undulating surface of the scrolling wheel 42 projecting through the selected window 24 of the main housing 12, with the display 30 (TFT/OLED or segmented) likewise projecting through the second annular rim defining window 26. FIG. 3 is a cutaway of FIG. 2 and depicting the scrolling wheel 42 with integral shaft 40, support bearings 58/60 and mounting plates 50 and 52 in combination with the outer housing 12 and display 30 components.

FIG. 4 is a further perspective of the inner components of the scrolling shifter with the housing removed for clarify of illustration, such including the orientation of the scrolling wheel 42 sandwiching inner plates 50/52 and display. Additional mounting fasteners, again at 20, are provided for securing the assembly together.

FIG. 5 is an enlarged perspective of the scrolling wheel 42 and depicting a non-limiting representation of the outer annular knurled pattern (alternating ridges 44 and recesses 46) for engagement by a user☐s (operator☐s) thumb or fingers. In combination, the upper end face arrayed detent profile 48 possesses alternating peaks/ridges and valleys/trenches, against which the spring biased pawls 62 contact to provide the desired haptic effect.

Figure 6:
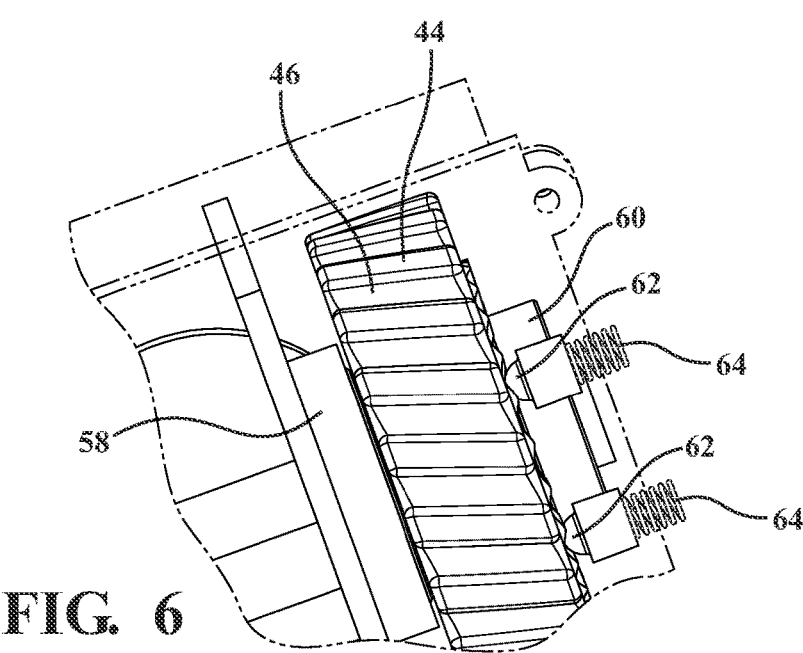
FIG. 6 is a partially transparent view of the scrolling wheel with detent pawls and backing springs for biasing the pawls against the detent profile and in order to vary a compressive force exerted against the wheel as the pawls progressively displace between the peaks and trenches configured within the detent profile in response to rotation of the wheel.

FIG. 6 is a partially transparent view of the scrolling wheel 42 with detent pawls 62 and backing compression springs 64 for biasing the pawls against the detent profile and in order to vary a compressive force exerted against the wheel 42 as the pawls 62 progressively displace between the peaks and trenches configured within the detent profile in response to rotation of the wheel. This results in the pawls 62 (such being seated within pockets configured within the right plate 52 which are located proximate the central rotatable support recess 56) exerting a continuous biasing force against the detent profile of the scrolling wheel in order to provide a haptic (or tactile) rotational adjustment interface as the peaks compress the pawls 62 against the compression springs 64.

FIG. 7 is a substantial repeat of the illustration of FIG. 2 and FIG. 8 likewise being a substantial repeat of the illustration of FIG. 3 and better depicting the features of the scrolling wheel 42 and end supported magnet 68 which, upon rotation in proximity to the PCBA mounted sensor 72, signals the associated processor to a gear shift condition. As described, and upon the scrolling wheel being rotated as referenced by bi-directional arrow 65, the shaft end supported magnet 68 co-rotates (see further rotational arrow 76 in FIG. 8) arranged in proximity to the PCBA sensor in order to instruct an electronic gearshift change.

FIG. 9, again further depicts a non-limiting exterior annular pattern associated with the scrolling wheel, this again including the alternating and angled knurled projections 44 and recesses 46. Also depicted is the side disposed detent profile 48 configured on the exterior side of the wheel 42 for biasing against the spring loaded pawls 62.

As described, and upon the scrolling wheel 42 being rotated, the detent profile 48 interfaces with the detent pawls 62 that are backed with the compression springs 64. In this manner, and as the wheel is rotated in order to biasingly displace the pawls 62 between the alternating peaks and trenches of the detent profile 48, the springs 64 are compressed and the related effort to compress the springs is readily felt (haptic or tactile) by the operator.

The determined effort is further defined by each of the height of the detent peaks, the corresponding depth of the detent trenches alternating with the peaks, the determined angle between the detents, the surface shape/roughness or material construction of the detent pawls and detent profile, and the spring compression rate. The gear selection is further dependent upon the angular distance between the alternating trenches, this corresponding to the rotation of the magnet relative to the PCBA mounted sensor.

Proceeding to FIGS. 10A and 10B, illustrated are a pair of views of an electronic return to park condition in which the shifter provides for returning to park from any gear upon command by the processor. Without limitation, this typically results from an external located sensor (not shown) and such as can be associated with any of a number of functions (such as for determining if a vehicle door is open). Upon the remote sensor (such as interconnected to the PCBA via one or more extending cables) indicating that an exterior condition exists which is inconsistent with the vehicle being in any gear outside of park, the PCBA processor is so instructed and in turn electronically resets the shifter to the park position (again FIG. 10A) from a non-park position (see for example drive position again in FIG. 10B).

The present application also provides each of park lock and neutral lock functionality. In particular, a description will now be had as to the structure and functionality of the park and neutral lock functionality of the present design and which provides an operator lock function in each of the Park and Neutral shifter positions in order to prevent binding of the motorized assembly in either engaged position as well as to ensure that certain conditions are met in order for the shifter to disengaged from either of the Park or Neutral positions.

Figure 11B:
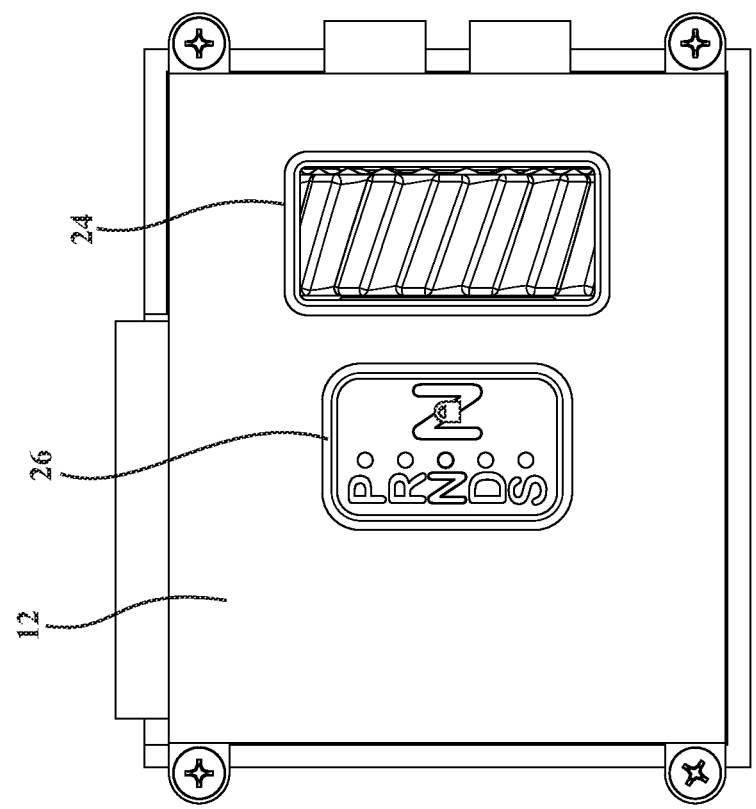
FIGS. 11A and 11B further illustrate a pair of views of an electronic park lock or neutral lock condition associated with the scrolling shifter.
Figure 11A:
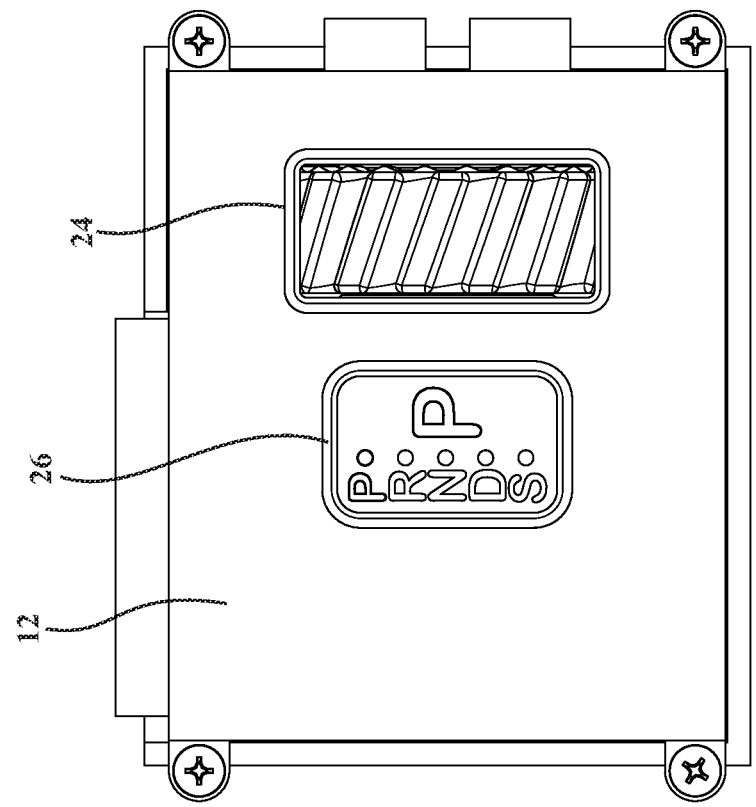

FIGS. 11A and 11B further respectively illustrate a pair of views of an electronic park lock or neutral lock condition associated with the scrolling shifter. Without limitation, the park lock (FIG. 11A) functions to require that the operator first depress the vehicle brake pedal (not shown) in order to subsequently actuate the scrolling wheel in order to shift the vehicle from the park position. Otherwise, and absent the brake pedal being first depressed, rotation of the scrolling wheel can occur however the vehicle will remain in park until the condition is met and the PCBA instructs the gear change. Concurrently, and with reference to FIG. 11B, the neutral lock function result in the shifter maintaining neutral gear upon command given by the operator, and in which rotation of the scrolling wheel being permitted with no change in gear until the conditions required by the PCBA are satisfied.

Figure 13:
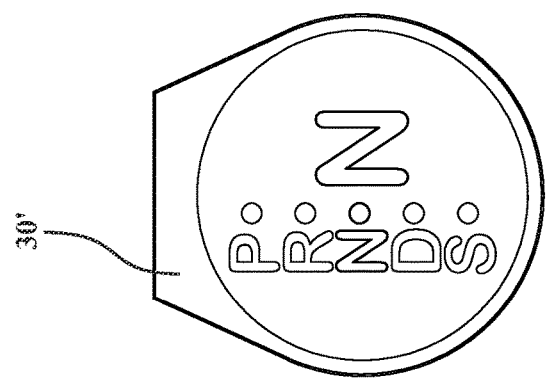
FIG. 13 is a plan view of a related graphic display illustrating a varied depiction such as which can be accomplished without etching or other customizing processes.
Figure 12:
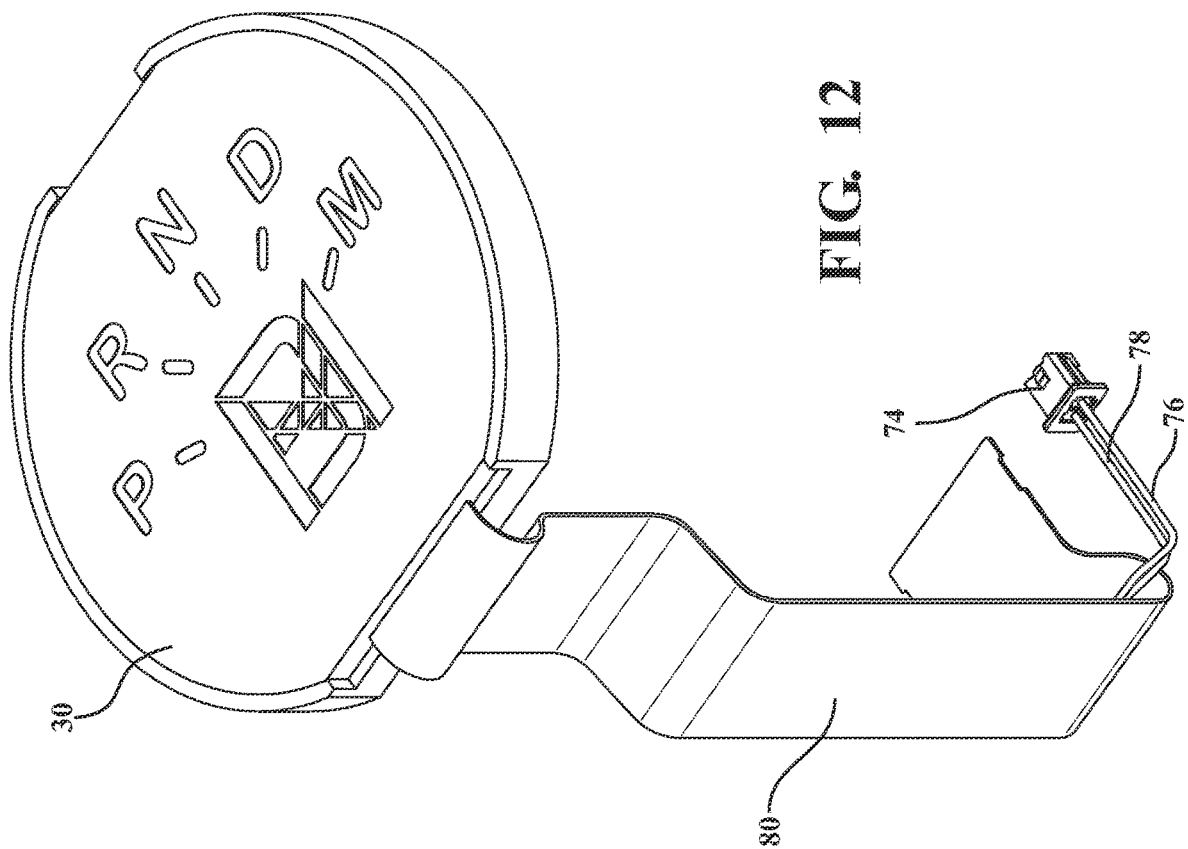
FIG. 12 is an illustration of a graphic display component associated with the shifter assembly and including any of TFT/OLED or segmented display variants.

FIG. 12 is an illustration of a variation of the graphic display component (again at 30 in FIG. 1) associated with the shifter assembly and including any of TFT/OLED or segmented display variants. FIG. 13 depicts a plan view, at 30U, of a related graphic display illustrating a varied depiction such as which can be accomplished without etching or other customizing processes. In each instance, a customized depiction is provided of a plurality of shifter positions PRNDM or PRNDS and by which any of a pixelated or segmented image can be provided on a non-etched (e.g. thin film transistor or organic LED display).

The present invention discloses the display component 30 as being not limited to any improved graphical display for incorporating into a shifter assembly for providing identification of a shifter position. The improved display can again incorporate any of thin film display (TFT), transistor LCD, or organic LED (OLED) display variants and which allows for any representation not limited to color, pattern or intensity to be created within a display surface geometry (again such as not limited to either of a round display in a rotary shifter or a rectangular display associated with a linear gate shifter or the like). The present invention further allows for the use of a clear display surface (not having any painting or etching associated with known shifter position indications PNRD) and which is only limited by operating software communicated from the associated circuit board and microcontroller.

In each variant, a display housing is located remote from the PCBA 66 and can incorporates a plurality of LED or suitable illuminating components. An end connector 74 provides Led backlight power for the segmented display variant. Also shown are connecting wire leads 76/78, each extend from the surface display housing to connect to the PCBA, with the surface display in one variant being generically provided without any specific etched or painted representations and which is modifiable in both color and intensity based upon the inputs received from the PCBA to achieve a desired illumination scheme.

A connector (ribbon shaped) 80 communicates LCD (liquid crystal) segments contained within the display 30 (not shown) to the PCBA, as well as providing LED power for the TFT and OLED display versions, and by which individual wires within the ribbon illuminate are communicated to the selected segments of the display surface. In this manner, and based upon the collection of individual inputs communicated from the main microcontroller located on the PCBA, a desired illumination scheme is achieved.

Additional features include the programmed surface display (such as associated with OLED/TFT variants) depicting a current selected gear shown in enlarged depiction in the center of the graphical display. The PCBA board may further include a main microcontroller with a serial communication protocol not limited to any of LIN, SPI, and 12C. Other features include the PCBA board exhibiting a main microcontroller with a serial communication protocol not limited to any parallel interface established between the main microcontroller and the graphic display.

Figure 14:
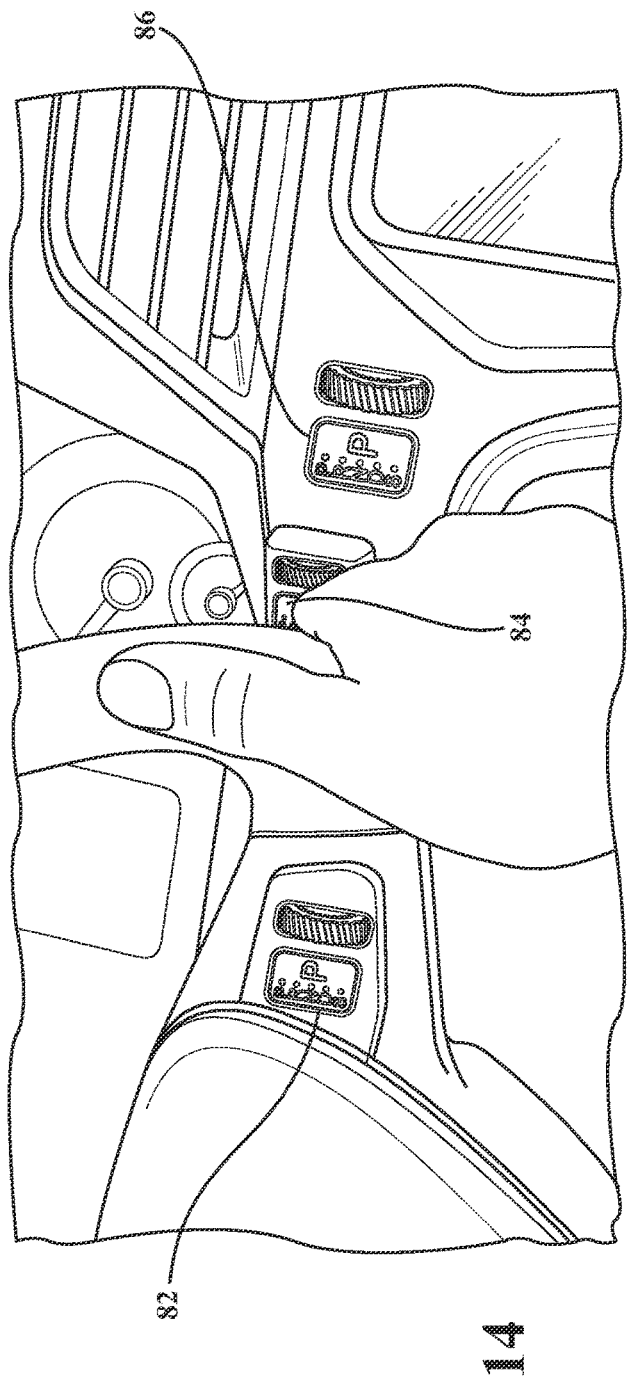
FIGS. 14-15 depict a pair of environmental views illustrating the ability to integrate the shifter assembly to a variety of locations within the vehicle interior not limited to any of the steering wheel, column, dashboard/instrument panel or console.
Figure 15:
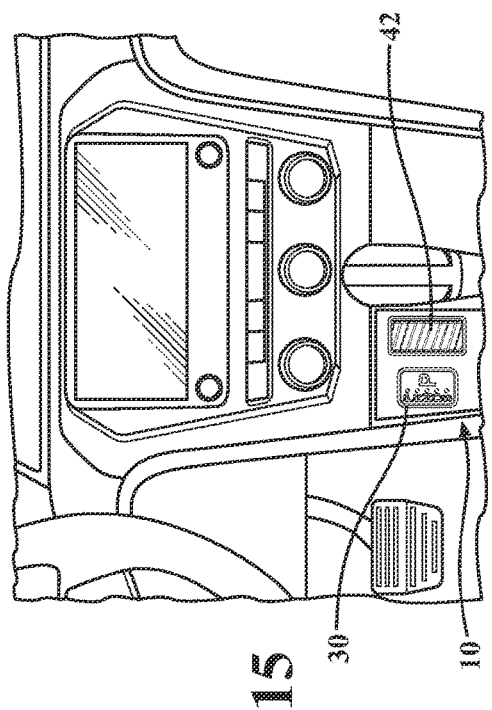
Figure 16:
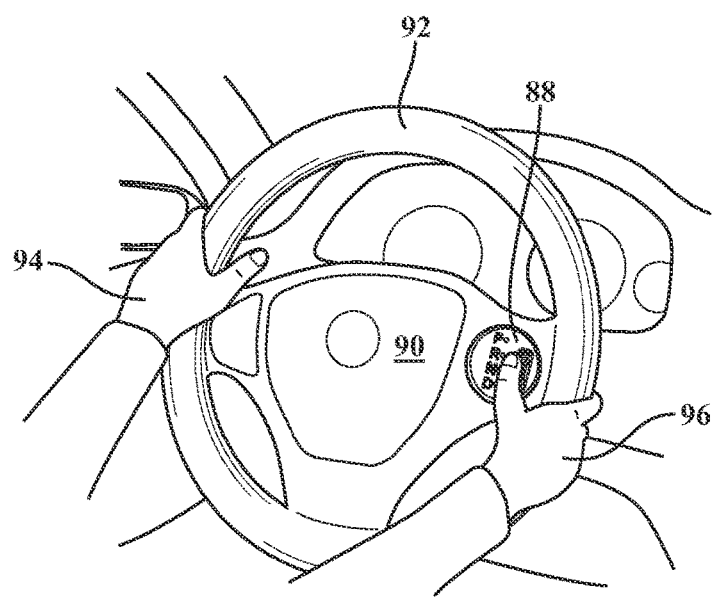
FIG. 16 is an illustration of an alternate mounting arrangement in which the scrolling shifter assembly is located upon the steering wheel for ease of access by a user s digit when the hand is supported upon the wheel.

FIGS. 14-15 depict a pair of environmental views illustrating the ability to integrate the shifter assembly to a variety of locations within the vehicle interior, as further shown in FIG. 16 being not limited to any of the steering wheel (at 82), steering column or other proximate location (at 84), dashboard/instrument panel or console (at 86). FIG. 15 depicts a further variant of one potential mounting configuration for the scrolling shifter assembly associated with the vehicle center console, such intended to represent the ability to modify the package size and location of the assembly 10 depending upon the mounting environment (i.e. within the steering wheel or column and as opposed to incorporating into the vehicle dash, IP or console).

FIG. 16 is an illustration of an alternate mounting arrangement in which a non-limited variant of a scrolling shifter assembly is provided and which can exhibit a redesigned rotary shaped housing 88, such as which is incorporated into a central exposed location 90 of the vehicle steering wheel 92, and for ease of access by a user☐s digit when the user☐s hands (at 94 and 96) are supported upon the wheel 92. As will be described, the redesign of the scrolling assembly again includes both the display (at 98 in FIG. 17) and scrolling wheel (further at 100) along with all of the other interior components as previously described in the corresponding assembly 10, while also allowing for concurrent rotation/reorientation in response to rotation of the steering wheel 92, this in order to maintain an upright orientation of the assembly at all times.

Figure 17:
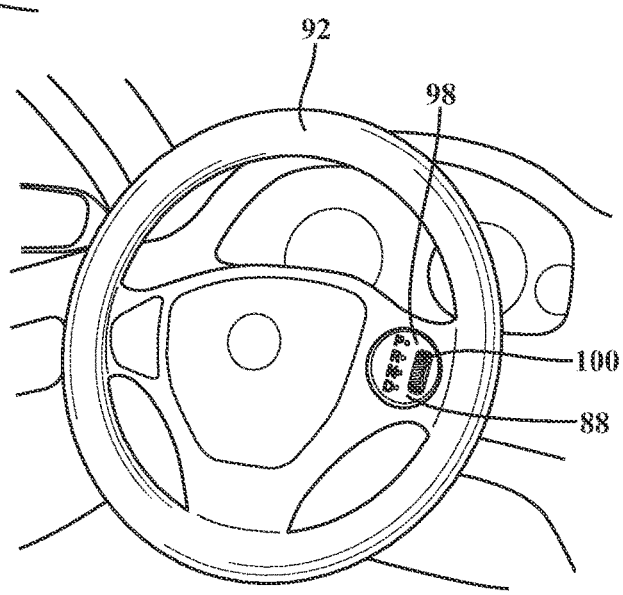
FIG. 17 is a similar illustration to FIG. 16 and with the wheel in a straightened and initial upright orientation.
Figure 18:
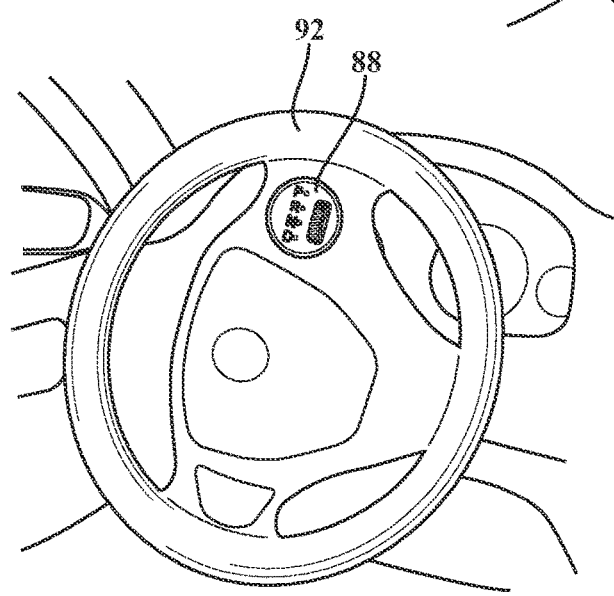
FIG. 18 is a succeeding illustration to FIG. 17 in which the wheel is rotated approximately ninety degrees counter-clockwise, with the scroll shifter being likewise cooperatively rotated within the steering wheel and in order to maintain a continuous upright orientation regardless of the rotational position of the wheel.

FIG. 17 is a similar illustration to FIG. 16 and with the wheel in a straightened and initial upright orientation. FIG. 18 is a succeeding illustration to FIG. 17 in which the wheel is rotated approximately ninety degrees in a counter-clockwise direction, with the scroll shifter 88 being likewise cooperatively rotated within the steering wheel 92, again in order to maintain a continuous upright orientation regardless of the rotational position of the wheel.

Figure 19:
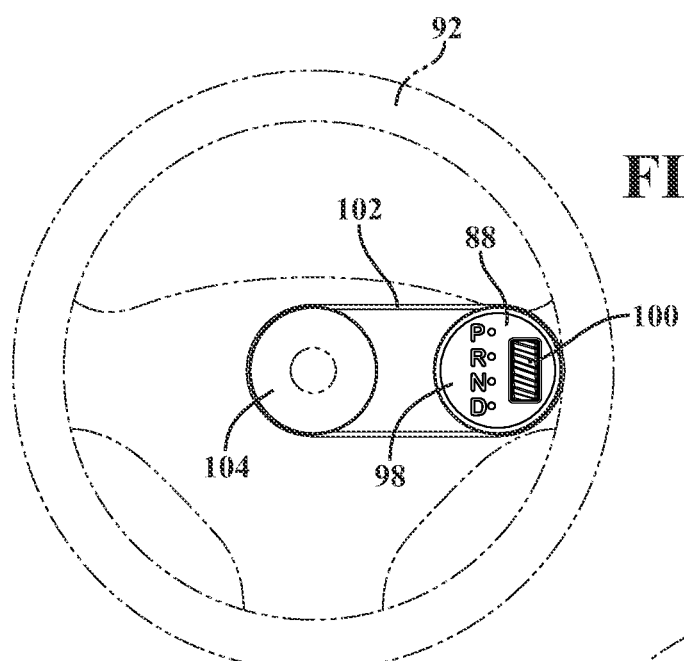
FIG. 19 illustrates a first alternate variant for cooperatively rotating the scroll shifter assembly along with the operator rotation of the steering wheel and which includes a toothed or other frictional engaging drive belt interconnecting the rotary shaped scroll shifter with a central supporting gear incorporated into the steering wheel.

FIG. 19 illustrates a first alternate variant for cooperatively rotating the scroll shifter assembly 88 along with operator rotation of the steering wheel 92, and which includes a toothed or other frictional engaging drive belt 102 interconnecting either of a toothed or frictionally engaging outer circular circumference associated with the rotary shaped scroll shifter assembly 88 and a central supporting gear or like support 104 incorporated into the steering wheel. This mechanical embodiment contemplates a number of sub-variants, including the central located gear or support 104 defining a central rotational axis of the steering wheel 92 and which, upon being rotated by the operator, can in turn be rotated in unison to impart a continuous upright orientation to the circular cross sectional shifter assembly 88. This can further envision the steering wheel supported assembly 88 being supported within a bearing ring or like arrangement (not shown) to allow free rotation in response to being acted upon by the drive belt 102.

Figure 20:
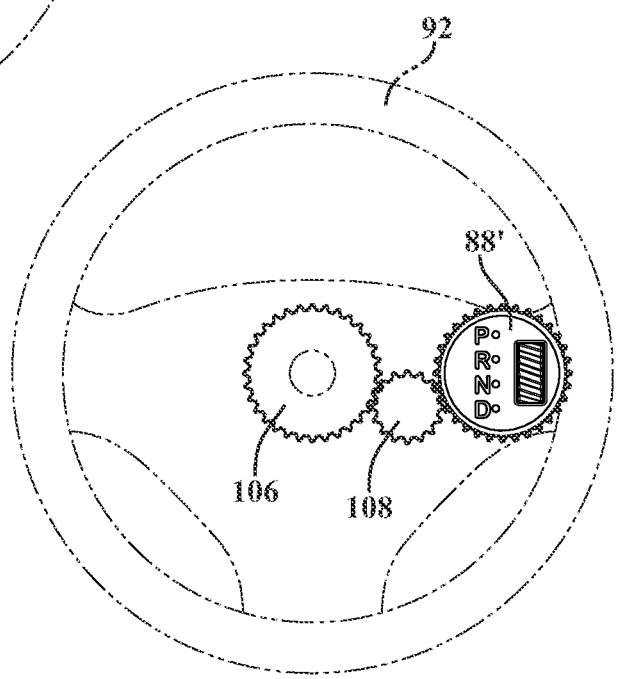
FIG. 20 illustrates a second alternate mechanical variant to FIG. 19 in which a series of interconnected gearwheels are provided for cooperatively rotating the rotary scroll shifter in response to rotation of the steering wheel.

Proceeding to FIG. 20, a second alternate mechanical variant to FIG. 19 is illustrated in which a series of interconnected gearwheels are provided for cooperatively rotating a reconfiguration 88U of the rotary scroll shifter in response to rotation of the steering wheel 92. The central gear or support is reconfigured, as shown at 106, and exhibits a toothed outer profile. An intermediate gear 108 is provided and translates the rotation of the central axis defined gear 106 to a toothed exterior of the reconfigured scrolling shifter 88U in order to effectuate a similar upright maintaining orientation of the assembly.

Figure 21:
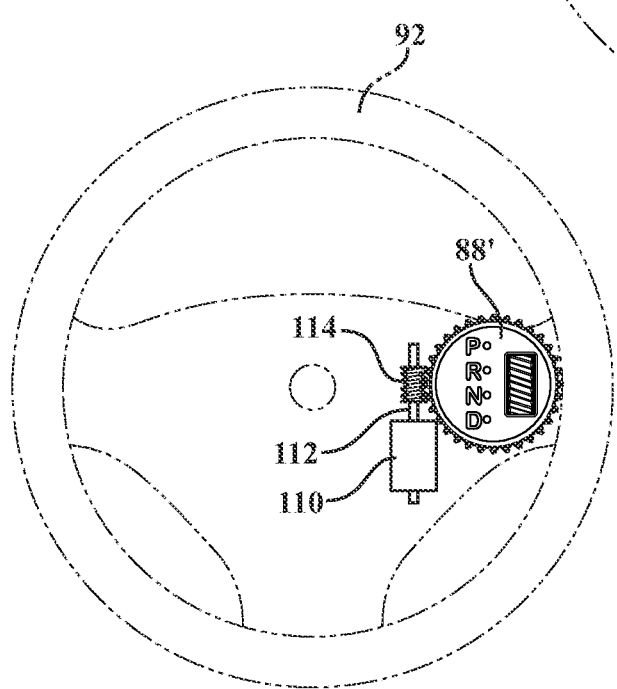
FIG. 21 illustrates a third electrically driven option in which a sensor arrangement is employed for converting rotation of the steering wheel into corresponding rotation of the rotary switching element.

FIG. 21 illustrates a third electrically driven option in which a sensor arrangement is employed for converting rotation of the steering wheel 92 into corresponding actuation and rotation of an electric motor 110 operating as a powered switching element. As shown, an output shaft 112 of the motor incorporates a bevel gear portion 114 which is in turn in contact with the exterior toothed profile of the shifter 88U and, upon actuation of the motor by the separate sensor (not shown) translates the degree of rotation of the steering wheel into real-time rotation of the shifter 88U in order to maintain its upright orientation.

Figure 22:
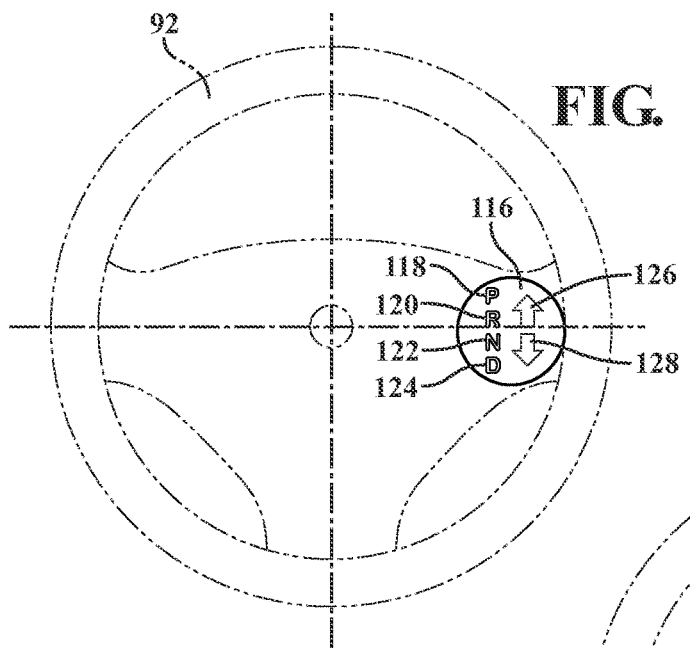
FIG. 22 illustrates a further electronically reorienting variant of a scroll shifter assembly and by which the steering wheel angle is measured with a sensor system for continuously reorienting to an upright viewed position any type of capacitive or other touch screen display positioned upon the steering wheel.

Proceeding to FIG. 22, a further electronically reorienting variant 116 is illustrated of a scroll shifter assembly and by which the steering wheel angle is measured with a similar sensor system (not shown) for continuously reorienting the assembly 116 to an upright viewed position. Without limitation, the assembly 116 incorporates any type of capacitive or other touch screen display including both PRND designations (areas 118, 120, 122 and 124). The scrolling wheel in this specific variant is substituted by an up arrow 126 and down arrow 128 for switching through the gear positions, again through the use of any type of capacitive touch or other touch screen functionality.

Figure 23:
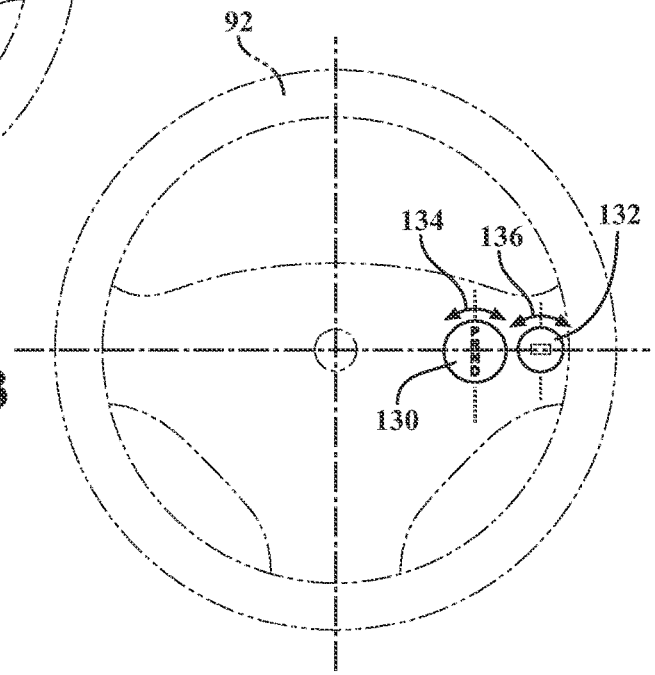
FIG. 23 provides a further variant in which an electronically reorienting display is provided separately along with a separate and likewise reorienting scrolling element.

FIG. 23 provides a further variant in which an electronically reorienting display 130 is provided separately along with a likewise rotating/reorienting and physically scrolling element 132 (similar to as shown in any of FIGS. 16-21). The individual elements cooperatively rotate (see arrows 134 and 136) in response to any mechanical or electronic input not limited to those described herein and in order to maintain both the scrolling element 132 and communicated display 130 in the upright orientation.

Figure 24:
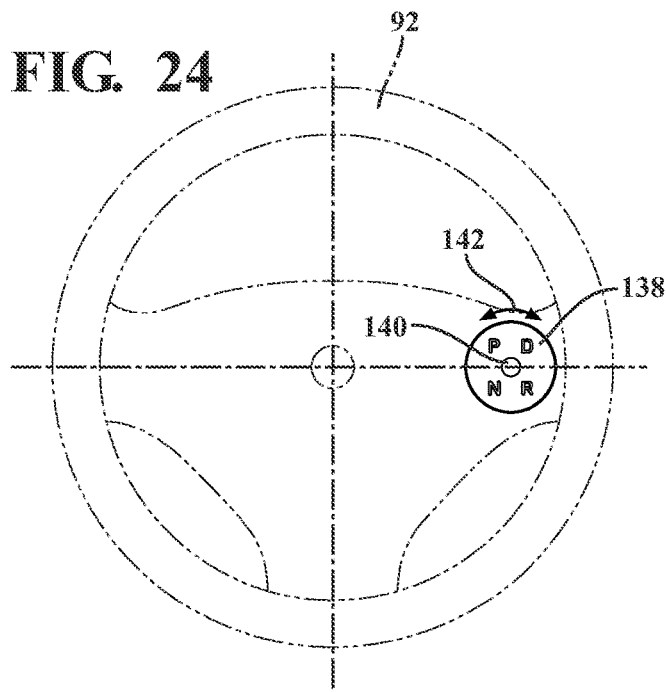
FIG. 24 illustrates a yet further variant of a rotationally adjusting/reorienting display by which a central joystick is incorporated into a redesigned orienting display.

FIG. 24 illustrates a yet further variant of a rotationally adjusting/reorienting display, see at 138, and by which a central joystick or toggle portion 140 is incorporated into a redesigned orienting display. As in previous embodiments, rotation of the steering wheel 92 results in a sensor or other reorienting causing a rotation (see bi-directional arrow 142) of the display 138 in a responsive manner Subset variants of this configuration can include the central joystick or toggle 140 being either fixed or rotatable along with the concentric outer positioned display portion, with manipulation of the joystick providing for shifting between the positions indicated on the display.

Figure 25:
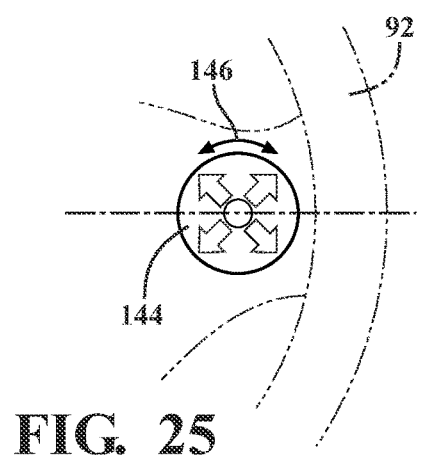
FIG. 25 is a subset variant including an auto-reorienting XY toggle incorporated into a rotatable display.

FIG. 25 further illustrates a subset variant including an auto-reorienting XY toggle 144 (see as further rotatably actuated bi-directionally by arrow 146). In this instance, a separate display (not shown) can optionally be provided at another location of the vehicle (such as fixed) for providing a readout display of a selected shifter position.

Figure 26:
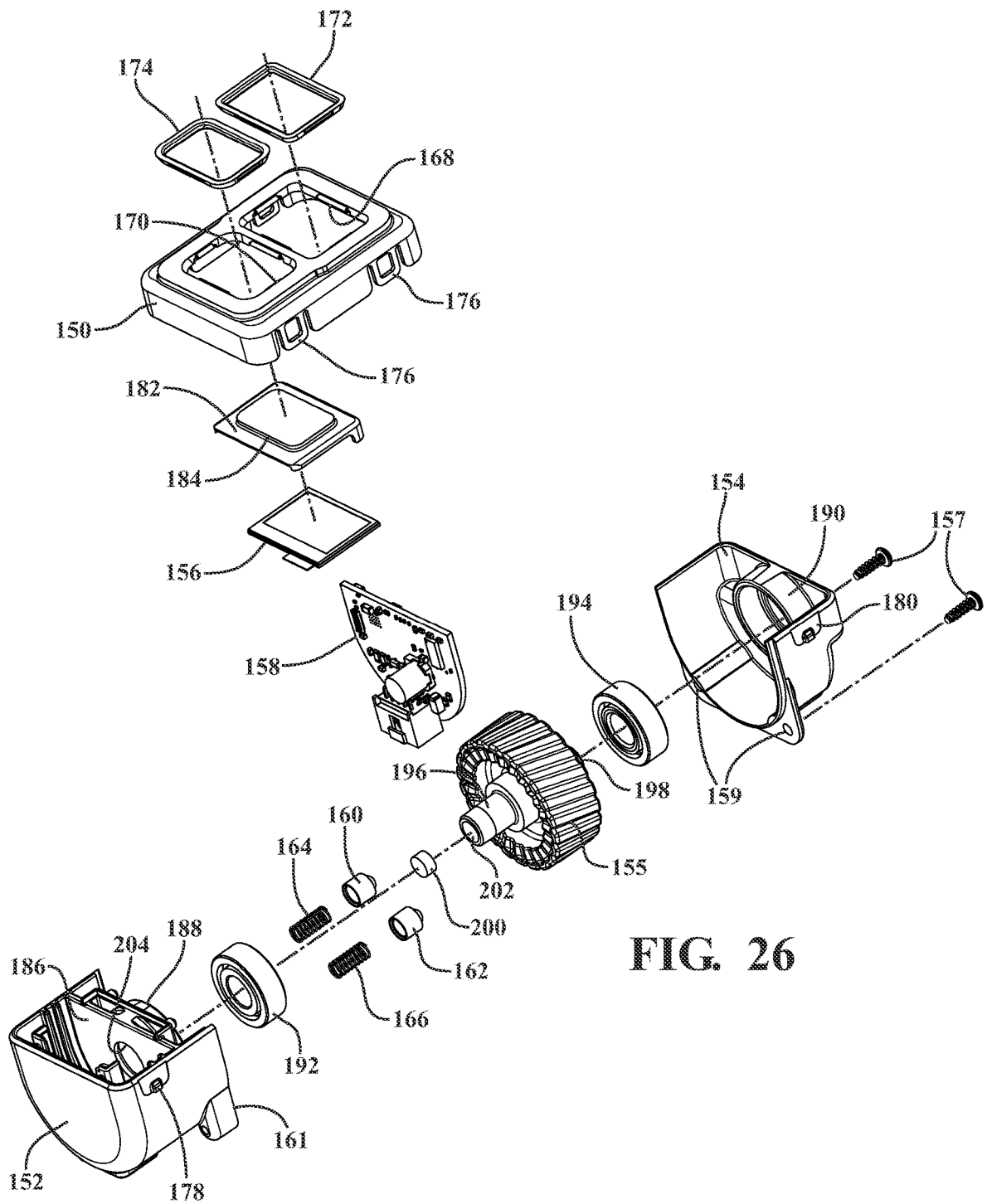
FIG. 26 is an exploded view of a scrolling shifter assembly according to a further non-limited embodiment of the present invention and illustrating redesigned upper and split lower housing portions for housing both a scrolling wheel and TFT/OLED display, along with PCBA, detent pawls and supporting compression springs.

Proceeding now to FIG. 26, an exploded view of a scrolling shifter assembly is shown (see also at 148 in assembled perspective of FIG. 27). The assembly 148 corresponds generally to that previously disclosed at 10 in FIGS. 1-13 and, according to a further non-limited embodiment of the present invention, illustrates a redesigned upper housing 150 and split lower housing portions 152 and 154 for housing both a scrolling wheel 155 and TFT/OLED or segmented display 156, along with PCBA 158, detent pawls 160/162 and supporting compression springs 164/166. A pair of mounting fasteners 157 are provided and insert through aligning locations 159 and 161 for inter-assembling the split lower housing portions 152 and 154.

The upper housing 150 includes a pair of apertures or cutouts defined by perimeter rim edges 168 and 170, these respectively receiving window shaped bezels 172 and 174 for each of the scroll knob and display. Inter-assembly of the upper housing 150 to the joined lower housings 152/154 include apertured edge tabs (a pair of which are shown at 176) in the upper housing which engage aligning upper side projections (further at 178 and 180) associated with the assembled lower housings 152/154.

A lens is provided having an outer perimeter skirt 182 for seating against an underside of the upper housing 150 surrounding its cutout location 170, the lens including a central upper embossed area 184 which seats within the cutout and mates with the associated bezel 174. The lower housing split portion 152 includes an interior wall 186 to define a separate interior chamber for receiving the PCBA 158. A pair of annular collar shaped supports are indicated at 188 and 190 for each of the lower split housing portions 152/154, with the collar shaped support 188 being configured upon a face of the interior wall 186 opposite the PCBA 158 and the collar support 190 configured upon an opposing inner end wall of the other lower split housing 154.

A pair of ball bearing style bushings 192 and 194 are provided which seat within the annular interior of the collar shaped supports 188/190 and which support opposite extending shaft portions 196 and 198 of the scrolling wheel 154. End magnet 200 is secured (such as by end molding) into a receiving end location 202 of the shaft portion 196 and so that, upon assembly, the shaft portion 196 projects through a central axis defining aperture (see inner rim 204) defined in the interior wall 186 in order to position the end-rotatable magnet 200 in proximity to the PCBA mounted sensor (see at 204 in FIG. 29).

FIG. 27 again provides a perspective assembled view of the scrolling shifter assembly of FIG. 26, with FIG. 28 further providing a subset perspective of the scroll wheel 154 with spring loaded detent pawls and knob bezel 172. Also depicted is the side disposed annular detent profile 206 configured into the scroll wheel 155, against which biases the spring loaded pawls 160/162 in order to provide the desired operator haptic effect as the pawls move between the detent trenches and peaks to in turn cause variations in the compressive force of the springs.

As previously described, the haptic effort/effect can be influenced by any of the height of the detent peaks (see again in FIG. 30 at 206, the depth of the interconnected detent trenches (further at 208), as well as the angle between each of the individual detents. Other haptic contributing features can include any of the surface shape of the detent profile, roughness or material selection of the detent pawl and profile, or the spring rate. As also previously described, gear selection is based on the angular distance between each of the succeeding trenches.

FIG. 29 is a cutaway view taken along line 29-29 of FIG. 27 and showing the interior assembled configuration of the scrolling shifter assembly, with the scroll knob 155 overmolded onto the shaft end supported magnet 200 positioned in relation to the PCBA mounted sensor 204. FIG. 30 again references an enlarged partial perspective, taken about area 30 of FIG. 28, and better showing the haptic feedback interface established between the spring loaded pawls 160/162 against the annular and undulating opposing side detent profile (peaks 206 and trenches 208) of the scroll knob which is generally perpendicular to its exterior knurled profile.

Figure 32:
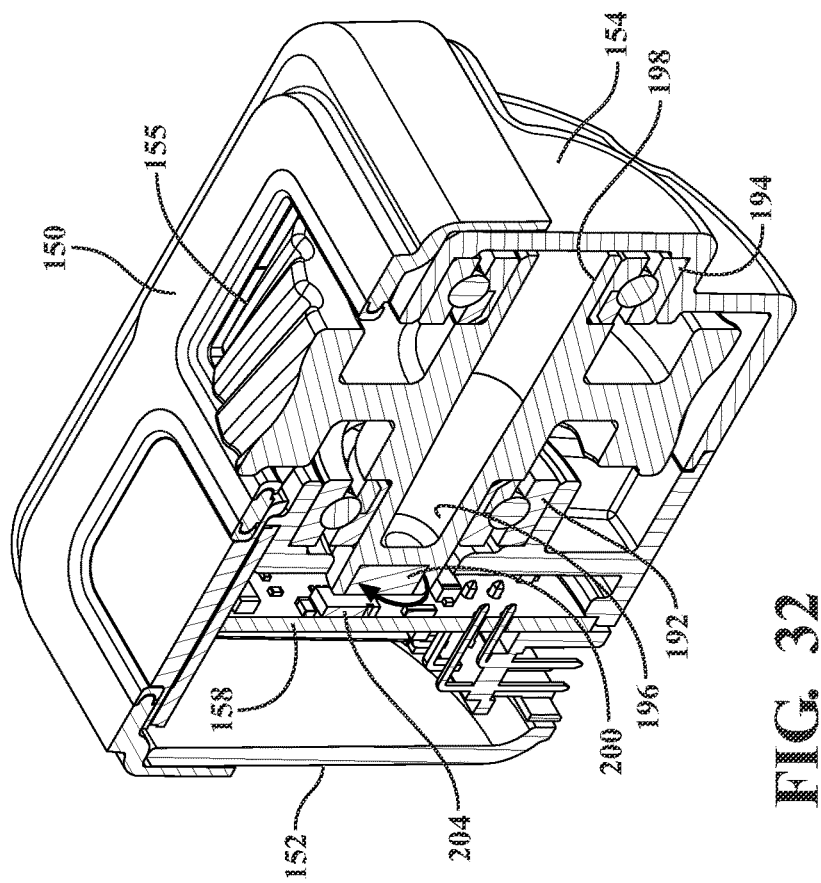
FIG. 32 is a repeat of the cutaway view of FIG. 29 and illustrating the rotation of the scroll knob end supported magnet relative to the opposing PCBA mounted sensor and which, at designated angular positions, results in the PCBA signaling the desired new gear to the engine control unit/module.
Figure 31:
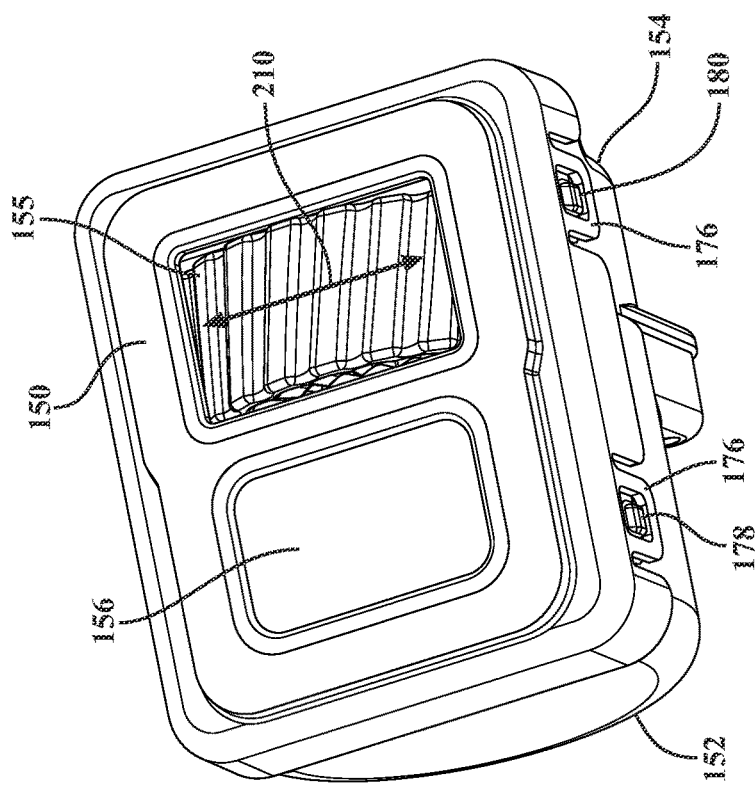
FIG. 31 is a repeat of scrolling shifter depicted in FIG. 27 and illustrating the bi-directional rotational aspect of the scrolling wheel and end supported magnet relative to the PCBA and sensor.

FIG. 31 is a repeat of scrolling shifter depicted in FIG. 27 and illustrating the bi-directional rotational aspect of the scrolling wheel 154 and end supported magnet 200 relative to the PCBA 158 and sensor 204. FIG. 32 is a repeat of the cutaway view of FIG. 29 and illustrating the rotation of the scroll knob end supported magnet (see bi-directional arrow 210) relative to the opposing PCBA mounted sensor and which, at designated angular positions, results in the PCBA signaling the desired new gear to the engine control unit/module (not shown).

Figure 33:
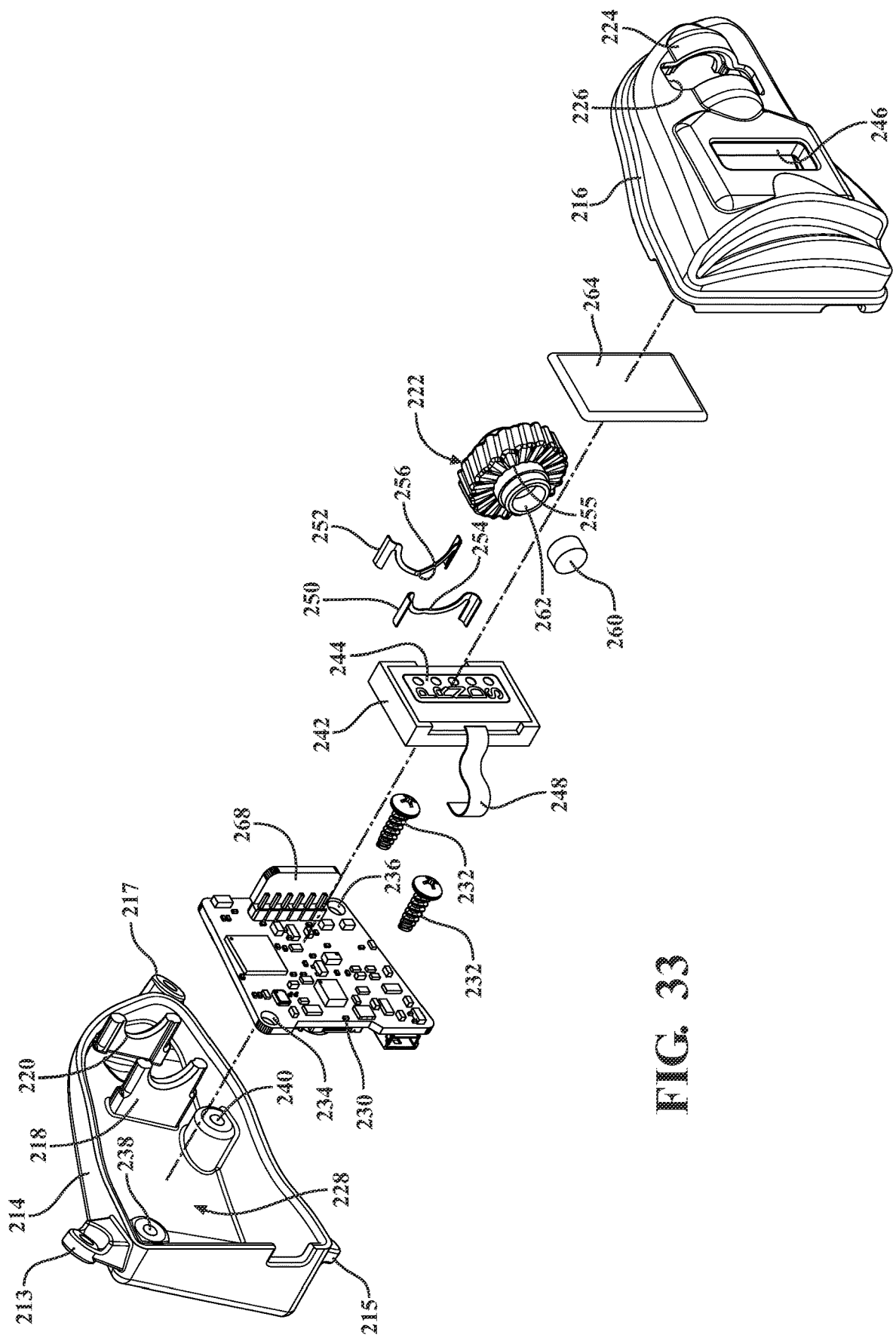
FIG. 33 is an exploded view of a scrolling shifter assembly according to a further non-limiting embodiment for a steering wheel mount application.

Proceeding to FIG. 33, an exploded view is now shown of a scrolling shifter assembly according to a further non-limiting embodiment (see also assembled perspective generally at 212) for a steering wheel mount application (this similar to the mounting application previously referenced at 82 in FIG. 14). A reconfigured lower housing 214 and upper housing 216 is provided, with the lower housing including a pair of integrated cradle locations 218/220 for receiving and supporting the scrolling wheel 222, such having an outer annular gripping surface providing the desired gripping profile when engaged by the user's finger or thumb.

The lower housing 214 includes edge extending ear locations 213, 215, 217 for mounting to a desired support, such as which can further include a side location of a steering wheel. The upper housing 216 further includes a raised forward facing location 224, within which is configured a slot shaped aperture (see interconnecting rim edge 226) for receiving and partially protruding the knurled outer profile of the scroll wheel 222.

Figure 39:
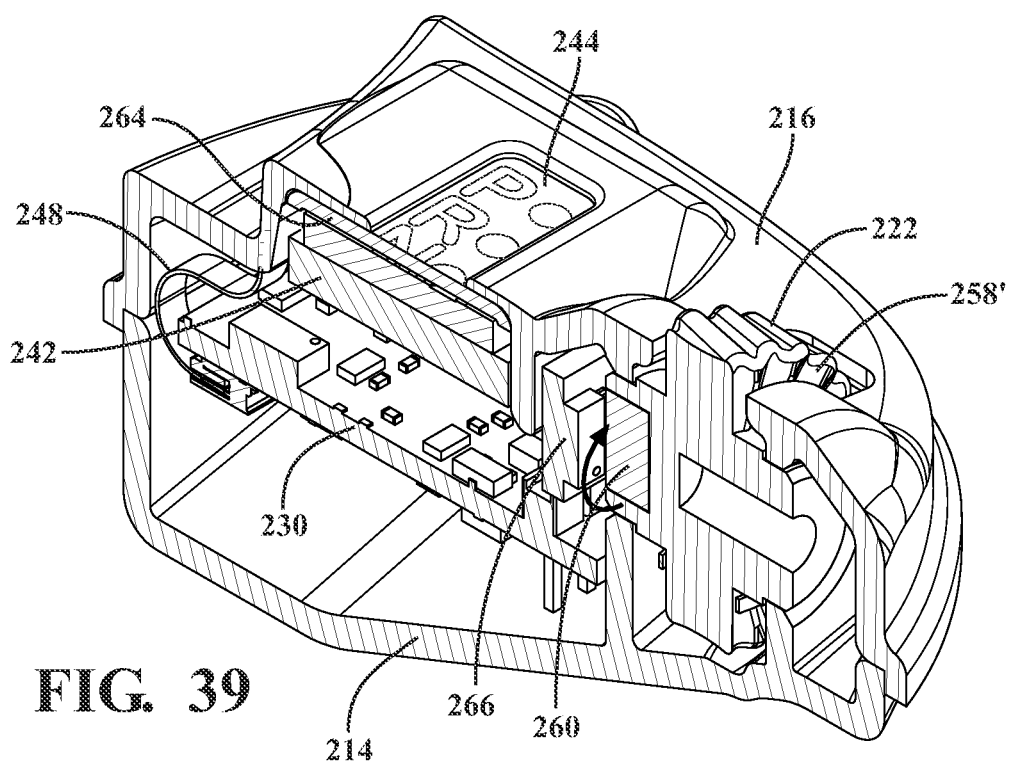
FIG. 39 is a repeat of FIG. 36 and illustrating the bi-directional rotational aspect of the scrolling wheel and end supported magnet relative to the PCBA and sensor.

The lower housing 214 further includes an open interior area 228 within which is supported a PCBA 230. A pair of mounting screws 232 are provided for installing the PCBA 230 via edge defined apertures 234/236 which align with apertured mounting posts 238/240 defined in the lower housing 214. A display component 242 (again including without limitation any of TFT, OLED or segmented variants) is supported within the upper housing 216 and so that an illuminating screen portion 244 of the display is evident through a further window 246 in the upper housing. A connector ribbon 248 associated with the display (such as corresponding to segmented display) extends from the component 242 to connect to the PCBA 230 (see as best shown in FIGS. 36 and 39).

A pair of wave springs 250 and 252 are provided which align with opposite sides of the scroll wheel 222 and which, as will be further described, include central arcuate protruding locations 254 and 256 which bias against opposing side detent profiles (one of which is shown at 258 in FIG. 33) of the scroll wheel 222. A round magnet 260 is integrated into a recessed side location of a spindle or shaft support 262 of the scroll wheel 222. This can include without limitation over-molding the scroll wheel in its entirety around the magnet. A lens 264 is also shown which can seat against an inside of the upper housing 216 for covering the illuminating portion 244 of the display component 242.

FIG. 34 again provides a front plan assembled view of the shifter assembly of FIG. 33. FIG. 35 is an enlarged and partial cutaway perspective depicting the scrolling wheel 226 with knurled outer profile mounted within the shifter housing of FIGS. 33-34 and further illustrating the side supporting wave springs 250/252 biasing against an opposite side of the scroll wheel (this further depicted by side detent profile 258 ′ hidden from view in FIG. 33, along with corresponding side positioned shaft support 262′ of the scroll wheel 222 which, in combination with the first opposite extending shaft 262 provides positional support for the wave springs 250/252). The wave springs 250/252 again substitute for the detent spring loaded pawls of previous embodiments, with the arcuate inner protruding locations or bends (see again at 254/256) providing the haptic interface with the annular detent profiles arranged on opposite sides of the wheel 222 (these again including first side haptic detent profile 258 in FIG. 33 and as further shown by opposite side haptic detent profile 258 ′ in FIGS. 35 and 37 which interfaces with the inward biasing portion 256 of the second wave spring 252).

FIG. 36 is a cross sectional cutaway of the shifter assembly of FIG. 34 and generally showing the interior assembled configuration of the shifter assembly with the scroll knob overmolded onto the shaft end supported magnet 260 which is positioned in relation to a proximately PCBA mounted sensor, this further depicted at 266 in each of FIGS. 35 and 36, forming part of an angled side supporting portion 268 of the PCBA 230 in order to be correctly positioned relative to the rotational direction of the scrolling knob magnet. FIG. 37 is a subset perspective of the scroll wheel 222 with opposite supported wave springs 250/252 for assisting in providing the haptic interface during rotation of the wheel (again shown by the opposing inward protrusions 254/256 which define respective first and second haptic interfaces with the opposing side annular detent profiles 258/258 ′ configured into the scroll wheel 222.

Figure 38:
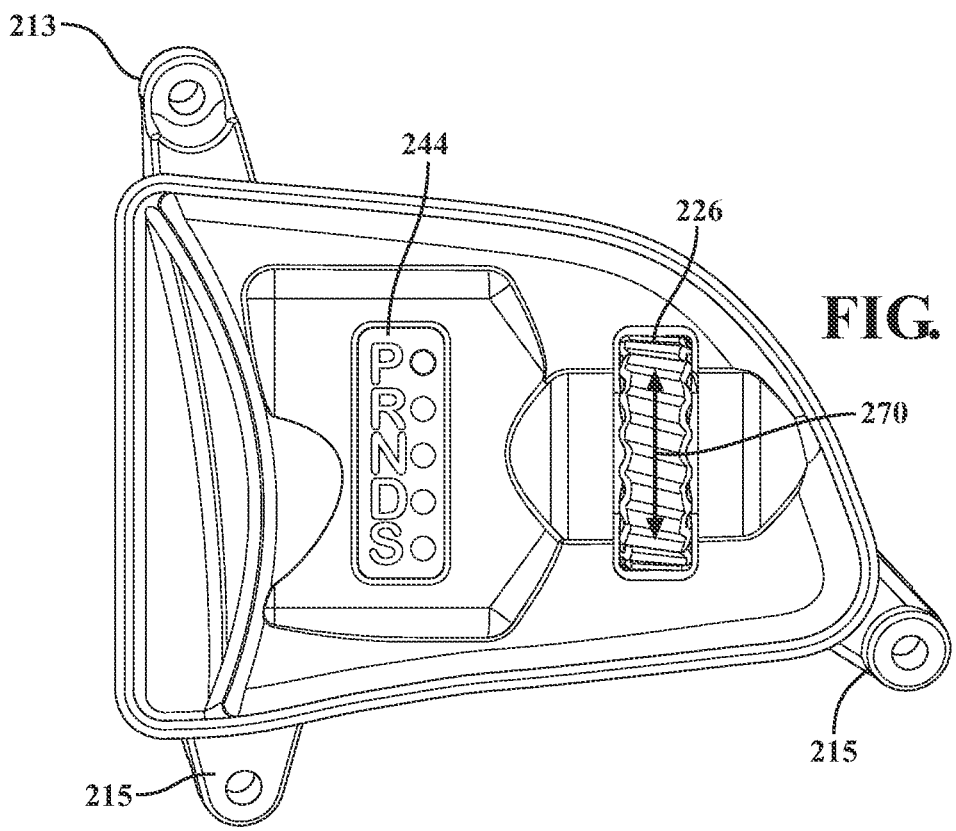
FIG. 38 is a repeat of FIG. 34 and depicting the bi-directional rotational aspect of the scrolling wheel.

FIG. 38 is a repeat of FIG. 34 and depicting the bi-directional rotational aspect of the scrolling wheel, as referenced by arrow 270. FIG. 39 is a further repeat of FIG. 36 and illustrating the bi-directional rotational aspect of the scrolling wheel 222 and end supported magnet 260 relative to the PCBA 230 and sensor 266.

Consistent with the previously described embodiments, the incorporation of the assembly into the desired (in this instance side-disposed) location of the steering wheel allows the driver to conveniently rotate or scroll the wheel 222 (such as while maintain the associated hand upon the wheel) in either of a forward or backward bi-directional fashion (again arrow 270). As the scrolling wheel is rotated, the magnet 260 rotates over the sensor 266 resulting in the processor component of the PCBA 230 determining a desired degree of angular movement in order to instruct a gear change of position to the vehicle ECU (engine control unit or module). The haptic effect and design options associated with the side biasing wave springs 250/252 against the opposing annular side detent profiles 268/268 ′ of the scrolling wheel 222 has also been previously described in earlier embodiments and is repeated in its entirety herein.

Figure 40:
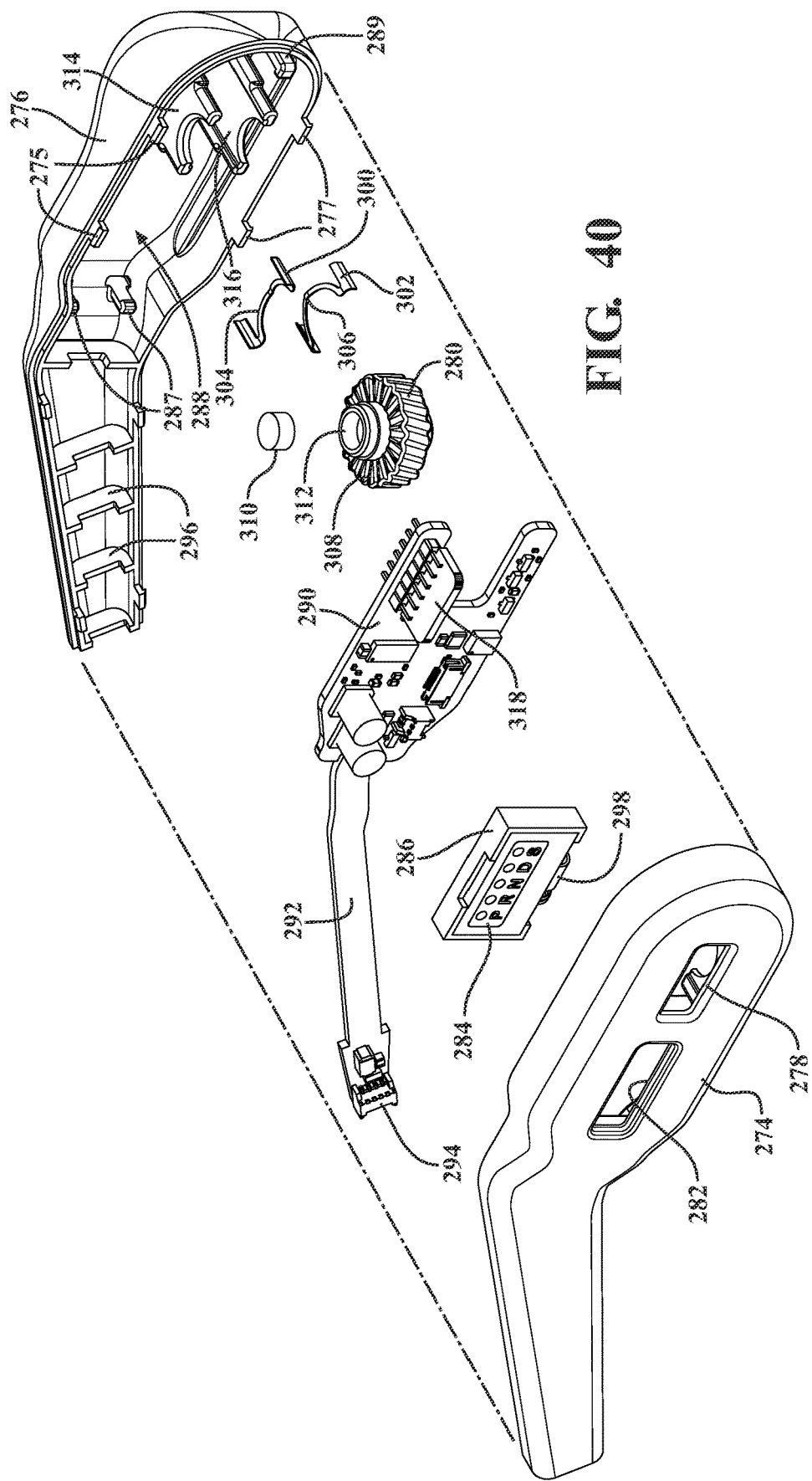
FIG. 40 is an exploded illustration of a steering column stalk mounted version of a scrolling knob shifter assembly according to a yet further embodiment of the present invention.

Proceeding to FIG. 40, an exploded illustration is shown of a steering column stalk mounted version of a scrolling knob shifter assembly (see generally at 272) according to a yet further embodiment of the present invention. The stalk mounted version of the scrolling assembly includes each of an upper housing 274 and a lower housing 276 which are configured to inter-assemble, see edge configured engagement tabs 275 and 277 for the lower housing which seat within receiving locations (hidden from view in FIG. 40 but depicted at 279 and 281 in the cutaway view of FIG. 44) configured in opposing and aligning locations of the upper housing 274 and so that the assembly is installed in supporting and extending fashion from the steering wheel column (not shown).

The upper housing 274 further includes a forward facing slot shaped aperture (see interconnecting rim edge 278) for receiving and partially protruding the knurled outer profile of an associated scroll wheel 280, along with a second forward facing and laterally spaced slot shaped aperture (further defined by rim edge 282) for framing an illuminating screen portion 284 of a display component 286 (again including without limitation any of a TFT, OLED or segmented version). As with previous embodiments, the rim edges 278 and 282 can further include the installation of bezel window portions in order to provide an enhanced finish to the assembly.

The lower housing 276 further includes an open interior area 288 within which is received a reconfiguration of a PCBA 290 (this further being assisted by pairs of engagement tabs 287 and 289 configured within the interior of the lower housing interior for fixing to the aligning side edges of the PCBA 290. A ribbon 292 and end connector 294 extends from the PCBA 290 to a base of the assembled stalk and so that the ribbon is supported within the stalk (see interior support ribs at 296 associated with the lower housing 276) with external inputs (such as remote return to park sensors and the like) are communicated to the PCBA 290 via the ribbon 292. A separate ribbon 298 also extends from the display component 286 to a connecting location on the PCBA 290.

A pair of wave springs 300 and 302 are provided which align with opposite sides of the scroll wheel 280 and which likewise include central arcuate protruding locations 304 and 306 which bias against opposing side detent profiles (one of which is shown at 308 in FIG. 40) of the scroll wheel 280. A round magnet 310 is integrated into a recessed side location of a spindle or shaft support 312 of the scroll wheel 280. This can again include without limitation over-molding the scroll wheel in its entirety around the magnet.

Figure 42:
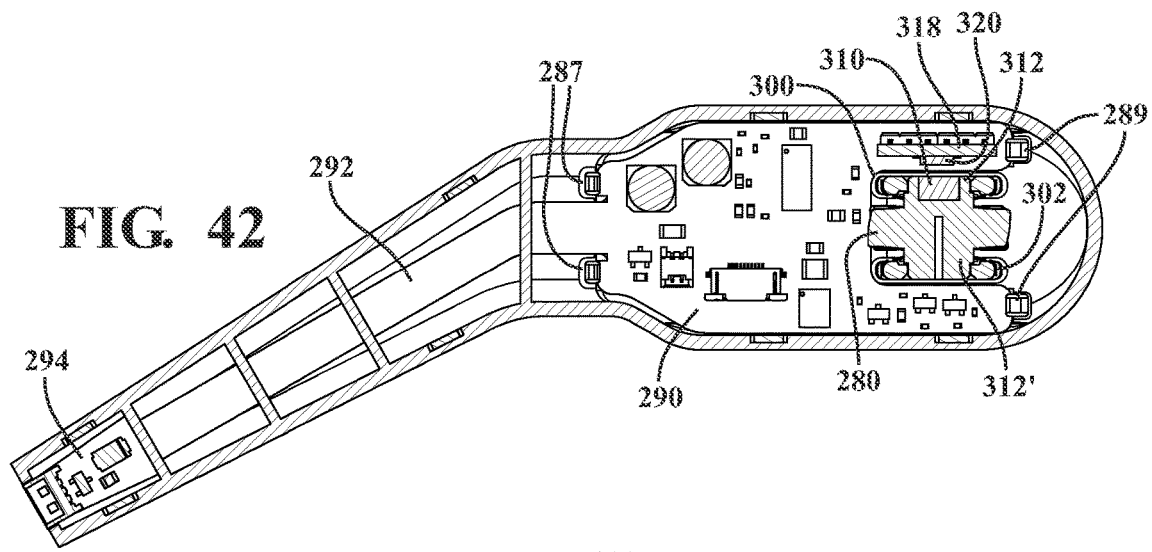
FIG. 42 is cross sectional cutaway of FIG. 41 with the upper housing removed and depicting the PCBA with ribbon and connector supported upon the lower housing along with the rotary scroll knob with end supported magnet and side haptic supporting wave springs.
Figure 43:
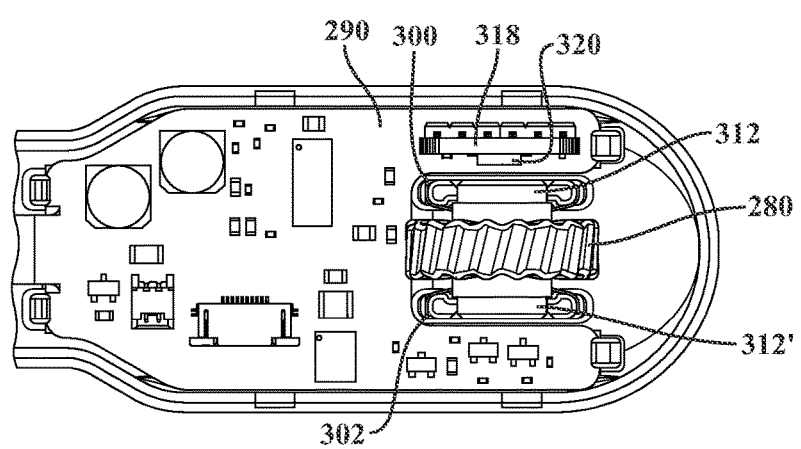
FIG. 43 is an enlarged view of FIG. 42, again with the upper housing removed, and depicting the scroll knob, side supporting wave springs and PCBA with proximally positioned sensor.

A pair of contoured cradle defining portions 314 and 316 are depicted projecting from the inside contoured surface of the lower housing 276 for receiving the opposite extending shaft portions (again at 312 and as further referenced at 312▯ in FIGS. 42 and 43). The PCBA 290 further includes an angled shelf support 318 upon which is positioned a sensor 320 (such as including without limitation an inductive sensor) in proximity to the magnet 310 and so that rotation of the scroll wheel 280 in either direction results in rotational displacement of the magnet relative to the sensor, in turn allowing the associated processor in communication with the PCBA to instruct a gear change to the ECU upon determining a certain angular rotation of the magnet.

Figure 41:
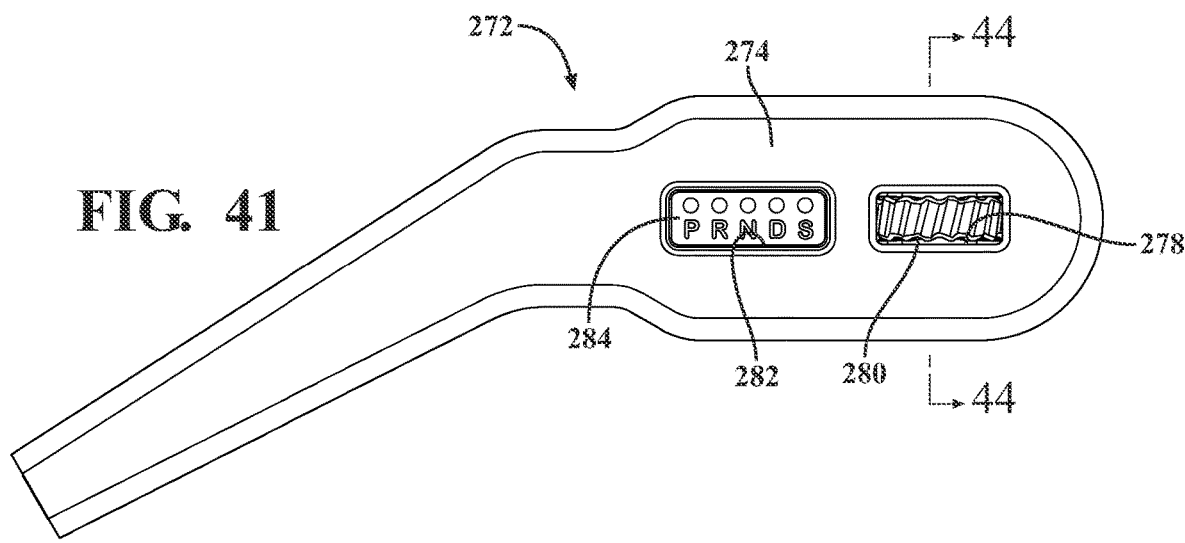
FIG. 41 is an assembled plan view of embodiment of FIG. 40 and depicting both the scroll knob and segmented or TFT/OLED display.

FIG. 41 is an assembled plan view of embodiment of FIG. 40 and depicting both the scroll knob 280 and segmented or TFT/OLED display component 286. FIG. 42 is cross sectional cutaway of FIG. 41, with the upper housing removed and depicting the PCBA 290 with ribbon 292 and connector 294 supported upon the lower housing 276 along with the rotary scroll knob 280 with end supported magnet 310 and side haptic supporting wave springs 300 and 302.

Figure 44:
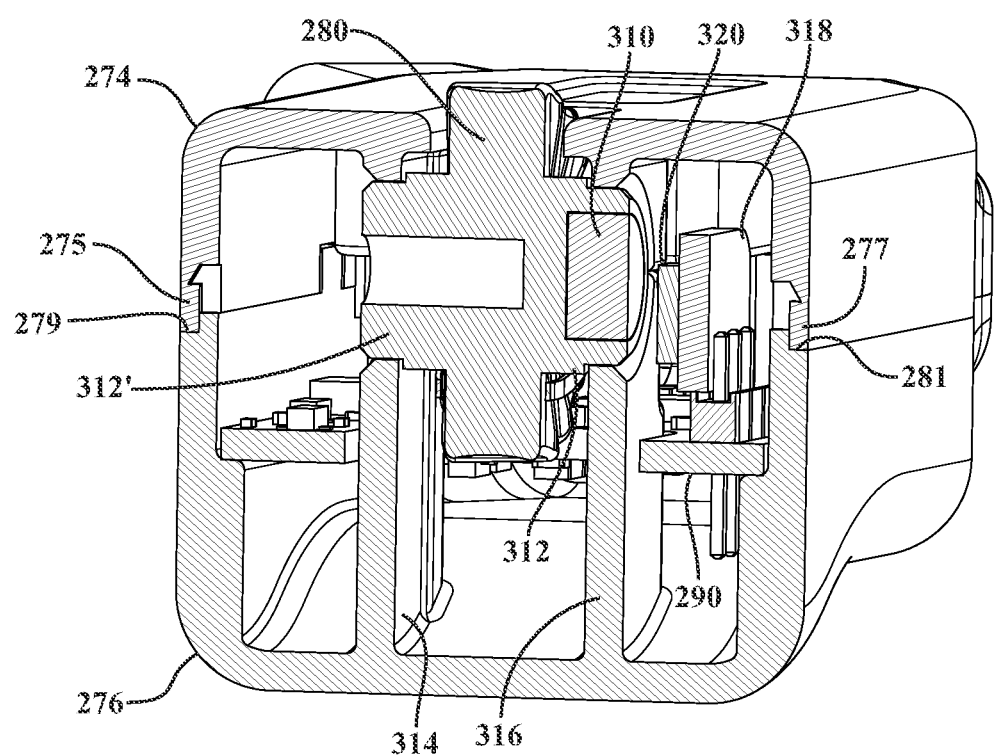
FIG. 44 is a cross sectional cutaway taken along line 44-44 of FIG. 41 and depicting from another vantage the rotatably supported configuration of the scrolling wheel with wave springs and rotatable end supported magnet positioned relative to the PCBA and sensor.

FIG. 43 further presents an enlarged view of FIG. 42, again with the upper housing removed, and depicting the scroll knob 280, side supporting wave springs 300/302 and PCBA 290 with proximally positioned sensor 320. FIG. 44 is a cross sectional cutaway taken along line 44-44 of FIG. 41 and depicting from another vantage the rotatably supported configuration of the scrolling wheel 280 with wave springs 300/302 and rotatable end supported magnet 310 positioned relative to the PCBA 290 and sensor 320.

Figure 45:
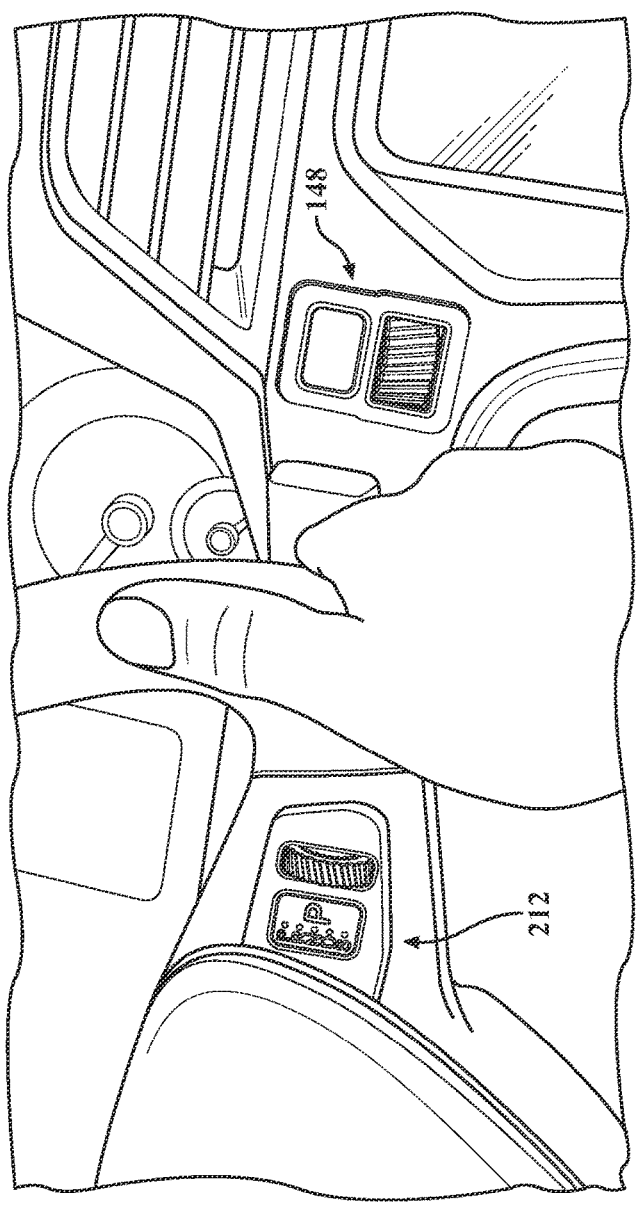
FIGS. 45-46 depict a pair of environmental views illustrating the ability to integrate the shifter assembly according to any of FIGS. 27, 34 and 41 to any of a variety of locations within the vehicle interior not limited to any of the steering wheel, steering column, stalk, dashboard/instrument panel or console.
Figure 46:
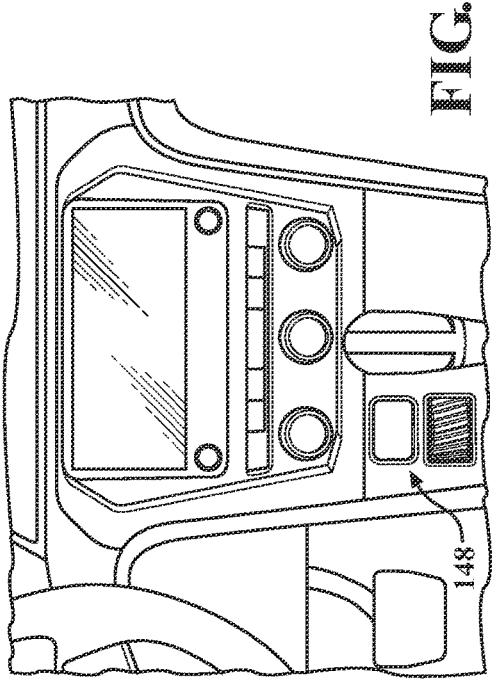

FIGS. 45-46 depict a pair of environmental views (similar to those previously presented in FIGS. 14-15) and illustrating the ability to integrate the shifter assembly according to any of FIGS. 27, 34 and 41 to any of a variety of locations within the vehicle interior not limited to any of the steering wheel (at 212 in FIG. 45), steering column, stalk, dashboard/instrument panel (at 148). This can also include an alternate arrangement of the assembly (again at 148) into the vehicle console as depicted in the alternate environmental view of FIG. 46.

The present invention according to any of the embodiments described herein provides a scrolling wheel vehicle shifter assembly which provides operator interface for transmission gear selection, as well as providing the operator with haptic feedback while shifting through the gear positions, such as again accomplished through the configuration of the annular detent profile against which is biased the spring loaded pawls for travel through the peaks and trenches/valleys of the profile.

Additional features again include providing the operator with polystable positions (i.e. fixed positions for each gear position). The scrolling wheel design of the present invention further provides the operator with the ability to continuously scroll the wheel, similar to the functionality of a computer mouse wheel, throughout the gear positions.

The present gear shifter design further again provides return to park functionality by which, in response to an external signal being received by the PCBA mounted processor (e.g. door opening or the like), causing the shifter position to be automatically resent to the Park position. Each of park lock and neutral lock functionality is also incorporated into the present design in order to prevent the vehicle from changing gears until certain preconditions are met (e.g. foot is depressed on brake) upon which the PCBA electronically allows the scrolling wheel to shift the vehicle.

The display provides gear position indication according to any desired design configuration or orientation. Additional features include the housing and assembly providing the design flexibility for orienting the scrolling wheel in any of up/down or left/right orientations. Other considerations include providing the design flexibility for reductions in package size in order to fit into numerous vehicle locations, including in particular the steering wheel or column as well as in the instrument panel (IP) dashboard or elsewhere.

It is further envisioned that the scrolling wheel assembly can be reconfigured for use in assemblies outside of vehicle gear adjustment. To this end, the term ▯shifter▯, as most broadly interpreted, is contemplated to apply to windshield wiper control, volume control, or dimmer control functions by non-limiting example.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as including, comprising, incorporating, consisting of, have, is used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, first, second, third, primary, secondary, main or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A scrolling shifter assembly, comprising:
   a housing rotatably supporting a scrolling wheel having an exterior edge profile accessible to a vehicle operator;
   said housing being supported within a steering wheel, rotation of which causing simultaneous rotation of the housing relative to the steering wheel in order to maintain said display in a continuously upright orientation regardless of the rotational position of the wheel;
   said scrolling wheel including a side positioned and annular detent profile;
   a magnet incorporated into said scrolling wheel and positioned in proximity to a sensor mounted to a printed circuit board supported within an open interior area defined within said housing;
   a display component connected to said printed circuit board, an illuminating screen portion of said display component visible through a window in said upper housing; and
   at least one biasing element supported within said housing in contact with said detent profile such that, and upon the operator actuating said scrolling wheel, said biasing element is caused to displace relative to alternating peaks and valleys configured into said detent profile in order to incrementally rotate the wheel, said magnet rotating relative to said sensor, causing said printed circuit board to signal a shift change.

2. The assembly of claim 1, further comprising at least one of a pair of first and second plates or spaced apart bearings secured within said housing for rotatably supporting said scrolling wheel therebetween.

3. The assembly of claim 2, said biasing element further comprising a pair of pawls biased by a pair of compression springs supported within said housing, said detent profile further including first and second detent profiles configured upon opposite sides of said scrolling wheel and against which said pawls bias.

4. The assembly of claim 1, said biasing element further comprising a pair of wave springs supported within said housing, said detent profile further including first and second detent profiles configured upon opposite sides of said scrolling wheel and against which protruding locations of said wave springs bias.

5. The assembly of claim 1, said display component further comprising any of a thin film transistor, organic light emitting diode or segmented display.

6. The assembly of claim 1, further comprising a return to park function in which said printed circuit board resets the shifter to Park in response to a determined external input.

7. The assembly of claim 1, further comprising each of a Park Lock and Neutral Lock function for preventing rotation of said scrolling wheel to effectuate a gear change unless said printed circuit board determines a necessary condition for providing electronic shifting.

8. The assembly of claim 1, further comprising said housing having a circular configuration with any of a toothed or frictionally engaging outer circumference.

9. The assembly of claim 8, further comprising a drive belt extending around said outer circumference of said housing and a center axis support within the steering wheel.

10. The assembly of claim 8, further comprising a series of interconnected gearwheels for cooperatively rotating said housing in response to rotation of the steering wheel.

11. The assembly of claim 1, further comprising said housing being supported within a steering wheel, a sensor measuring a steering wheel angle for continuously reorienting to an upright viewed position said display.

12. The assembly of claim 1, said assembly further comprising application to any of a gear shifter, windshield wiper control, volume control, or dimmer control.

13. The assembly of claim 1, further comprising a lens seating against said upper housing underneath said window and aligning with said illuminating screen portion of said display component.

14. The assembly of claim 1, said magnet further comprising a round shape integrated into a recessed side location of a shaft support of said scroll wheel.

15. The assembly of claim 1, further comprising a ribbon connector extending between said display component and said printed circuit board.

16. A scrolling shifter assembly, comprising:
a housing rotatably supporting a scrolling wheel having an exterior edge profile accessible to a vehicle operator;
said housing being supported within a steering wheel, rotation of which causing simultaneous rotation of the housing in order to maintain said display in a continuously upright orientation regardless of the rotational position of the wheel, said housing having a circular configuration with any of a toothed or frictionally engaging outer circumference;
a drive belt extending around said outer circumference of said housing and a center axis support within the steering wheel;
said scrolling wheel including a side positioned and annular detent profile;
a magnet incorporated into said scrolling wheel and positioned in proximity to a sensor mounted to a printed circuit board supported within said housing;
a display mounted in proximity to said printed circuit board and visible through a window in said housing; and
at least one biasing element supported within said housing in contact with said detent profile such that, and upon the operator actuating said scrolling wheel, said biasing element is caused to displace relative to alternating peaks and valleys configured into said profile in order to incrementally rotate the wheel, said magnet rotating relative to said sensor causing said printed circuit board to signal a shift change.

17. A scrolling shifter assembly, comprising:
a housing rotatably supporting a scrolling wheel having an exterior edge profile accessible to a vehicle operator;
said housing being supported within a steering wheel, rotation of which causing simultaneous rotation of the housing in order to maintain said display in a continuously upright orientation regardless of the rotational position of the wheel, said housing having a circular configuration with any of a toothed or frictionally engaging outer circumference;
a series of interconnected gearwheels for cooperatively rotating said housing in response to rotation of the steering wheel;
said scrolling wheel including a side positioned and annular detent profile;
a magnet incorporated into said scrolling wheel and positioned in proximity to a sensor mounted to a printed circuit board supported within said housing;
a display mounted in proximity to said printed circuit board and visible through a window in said housing; and
at least one biasing element supported within said housing in contact with said detent profile such that, and upon the operator actuating said scrolling wheel, said biasing element is caused to displace relative to alternating peaks and valleys configured into said profile in order to incrementally rotate the wheel, said magnet rotating relative to said sensor causing said printed circuit board to signal a shift change.

18. A scrolling shifter assembly, comprising:
an upper housing and a lower assembleable housing;
a scrolling wheel having an exterior edge profile accessible to a vehicle operator through a first aperture in said upper housing;
a magnet incorporated into a receiving end location of a shaft supporting said scrolling wheel and positioned in proximity to a sensor mounted to a printed circuit board supported within an open interior area defined within said housing;
a pair of bearing supporting bushings seating within an annular interior of said shaft on opposite sides of said scrolling wheel;
a display connected to said printed circuit board and visible through a second aperture in said upper housing; and
a biasing element supported within said housing in contact with said scrolling wheel in order to incrementally rotate said wheel, said magnet rotating relative to said sensor causing said printed circuit board to signal a shift change.

19. The assembly of claim 18, further comprising said scrolling wheel including a side positioned and annular detent profile.

20. The assembly of claim 18, further comprising at least one biasing element supported within said lower housing in contact with said detent profile such that, and upon the operator actuating said scrolling wheel, said biasing element is caused to displace relative to alternating peaks and valleys configured into said detent profile in order to incrementally rotate the wheel, said magnet rotating relative to said sensor.

21. The assembly of claim 20, said at least one biasing element further comprising a pair of detent pawls supporting compression springs.

22. The assembly of claim 18, said lower assembleable housing further comprising split lower housing portions.

23. The assembly of claim 22, further comprising a selected one of said split lower housing portions having an interior wall to define a separate interior chamber for receiving said printed circuit board.

24. The assembly of claim 18, further comprising said shaft supporting said scrolling wheel further comprising first and second opposite extending shaft portions.

25. The assembly of claim 18, said pair of bearing supported bushings further comprising ball bearing style bushings seating within collar shaped supports configured respectively in said first and second split lower housings.

26. The assembly of claim 18, further comprising a lens having an outer perimeter skirt sealing against an underside of said upper housing, an upper embossed area seating within said second aperture in said upper housing.

* * * * *

UNITED STATES PATENT AND TRADEMARK OFFICE
CERTIFICATE OF CORRECTION

| | |
|---|---|
| PATENT NO. | : 11,746,888 B2 |
| APPLICATION NO. | : 17/178881 |
| DATED | : September 5, 2023 |
| INVENTOR(S) | : Brian Andrew Mayville, Calogero Alu and Thorsten Dirk Connemann |

It is certified that error appears in the above-identified patent and that said Letters Patent is hereby corrected as shown below:

In the Claims

In Column 18, Line(s) 9-16, delete "at least one biasing element supported within said house in contact with said detent profile such that, and upon the operator actuating said scrolling wheel, said biasing element is caused to displace relative to alternating peaks and valleys configured into said detent profile in order to incrementally rotate the wheel, said magnet rotating relative to said sensor, causing said printed circuit board to signal a shift change."

And insert -- at least one wave spring supported within said housing, a central protruding location of said wave spring positioned in contact with said detent profile such that, and upon the operator actuating said scrolling wheel, said wave spring is caused to displace relative to alternating peaks and valleys configured into said detent profile in order to incrementally rotate the wheel, said magnet rotating relative to said sensor, causing said printed circuit board to signal a shift change. --, therefor.

Signed and Sealed this
Thirty-first Day of October, 2023

Katherine Kelly Vidal
*Director of the United States Patent and Trademark Office*